(12) United States Patent
Bleyer et al.

(10) Patent No.: US 12,217,383 B2
(45) Date of Patent: Feb. 4, 2025

(54) IMAGE ALIGNMENT USING CORNER AND LINE FEATURES

(71) Applicant: Microsoft Technology Licensing, LLC, Redmond, WA (US)

(72) Inventors: Michael Bleyer, Seattle, WA (US); Raymond Kirk Price, Carnation, WA (US); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 519 days.

(21) Appl. No.: 17/682,423

(22) Filed: Feb. 28, 2022

(65) Prior Publication Data

US 2023/0274384 A1    Aug. 31, 2023

(51) Int. Cl.
*G06T 7/33*  (2017.01)
*G06T 3/14*  (2024.01)
*G06T 3/60*  (2006.01)

(52) U.S. Cl.
CPC .............. *G06T 3/14* (2024.01); *G06T 3/60* (2013.01); *G06T 7/33* (2017.01)

(58) Field of Classification Search
CPC .... G06T 3/14; G06T 3/60; G06T 7/33; G06T 2207/20221; G06T 7/30; H04N 13/106; H04N 13/156; H04N 13/239; H04N 13/344; H04N 13/243; H04N 13/246; H04N 23/90; H04N 2013/0081
USPC ......................................................... 382/284
See application file for complete search history.

(56) References Cited

U.S. PATENT DOCUMENTS

2011/0169946 A1*  7/2011  Rudin ..................... G06T 17/05
                                                              348/135
2021/0392312 A1    12/2021  Bleyer et al.

FOREIGN PATENT DOCUMENTS

WO        20220015384 A1    1/2022

OTHER PUBLICATIONS

"International Search Report and Written Opinion issued in PCT Application No. PCT/US2022/050996", Mailed Date: Mar. 9, 2023, 13 Pages. (MS# 411058-WO-PCT).

\* cited by examiner

*Primary Examiner* — Charlotte M Baker
(74) *Attorney, Agent, or Firm* — Workman Nydegger

(57) ABSTRACT

Techniques for aligning image content are disclosed. The alignment occurs by concurrently identifying corner and line features and by aligning the images based on those features. As a result, relaxed constraints can be used during the alignment process as compared to constraints that are required when aligning images using only corner features. To achieve these benefits, first and second images are acquired. A first set of pixels that correspond to corner features are detected within the images. In parallel, a second set of pixels that correspond to line features are detected within the images. Image content is then aligned from the two images. The aligning process is performed using at least some of the pixels from the first and second sets.

20 Claims, 20 Drawing Sheets

IMAGE ALIGNMENT USING CORNER AND LINE FEATURES

BACKGROUND

Mixed-reality (MR) systems, which include virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content.

An MR system may also employ different types of cameras to display content to users, such as in the form of a passthrough image. A passthrough image or view can aid users in avoiding disorientation and/or safety hazards when transitioning into and/or navigating within an MR environment. An MR system can also provide augmented data to enhance a user's view of the real-world. An MR system can present views captured by cameras in a variety of ways. The process of using images captured by world-facing cameras to provide views of a real-world environment creates many challenges, however.

Some of these challenges occur when attempting to align image content from multiple cameras, such as an integrated "system camera" and a detached "external camera" when generating an overlaid image that will be displayed to a user. Challenges also occur when additional visualizations are provided in the resulting overlaid image, where these visualizations are designed to indicate a spatial relationship between the system camera and the external camera. Challenges can also occur if a flat field calibration is not performed. Accordingly, aligning image content provides substantial benefits, especially in terms of hologram placement and generation, so these problems present serious obstacles to the technical field. As such, there is a substantial need in the field to improve how images are aligned with one another.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices, and methods for aligning content from images that are generated by different cameras. The alignment is performed by concurrently identifying corresponding corner features and line features within the images and by aligning the images based on a combination of the identified corner features and line features. As a result of performing the disclosed operations, the embodiments allow for relaxed constraints during the alignment process as compared to constraints that are required when aligning the images using only the corner features.

Some embodiments acquire a first image generated by a first camera and acquire a second image generated by a second camera that is detached from the first camera. The embodiments detect, within both the first image and the second image, a first set of pixels that correspond to corner features. During an overlapping time period with when the first set of pixels are detected, the embodiments also detect, within both the first image and the second image, a second set of pixels that correspond to line features. The embodiments then align image content from the first image with corresponding image content from the second image. The aligning process is performed using at least some of the pixels in the first set of pixels, which correspond to the corner features, and using at least some of the pixels in the second set of pixels, which correspond to the line features.

Some embodiments provide techniques for aligning content from images that are generated by different cameras. The alignment is performed by concurrently identifying unambiguous features that are uniquely identifiable within the images and identifying potentially ambiguous features that are susceptible to aperture ambiguity. The alignment is based on a combination of the unambiguous features and the potentially ambiguous features, thereby resulting in relaxed constraints during the alignment as compared to constraints that are required when aligning the images using only the unambiguous features.

Some embodiments acquire a first image generated by a first camera and acquire a second image generated by a second camera that is detached from the first camera. The embodiments perform a first detection operation. This operation includes detecting, within the first image, a first set of pixels that correspond to unambiguous features that are uniquely identifiable within the first image. The process also includes detecting, within the second image, a second set of pixels that correspond to the unambiguous features that are included in the first image. During an overlapping time period in which the first detection operation occurs, the embodiments also perform a second detection operation. This second detection operation includes detecting, within the first image, a third set of pixels that correspond to potentially ambiguous features that are susceptible to aperture ambiguity. The second detection operation further includes detecting, within the second image, a fourth set of pixels that correspond to the potentially ambiguous features that are included in the first image. The embodiments then perform an alignment process in which image content from the first image is aligned with corresponding image content from the second image. The alignment process includes reprojecting at least some pixels in the second set of pixels to positions corresponding to positions of at least some pixels in the first set of pixels. The alignment process also includes reprojecting at least some pixels in the fourth set of pixels to positions corresponding to positions of at least some pixels in the third set of pixels.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
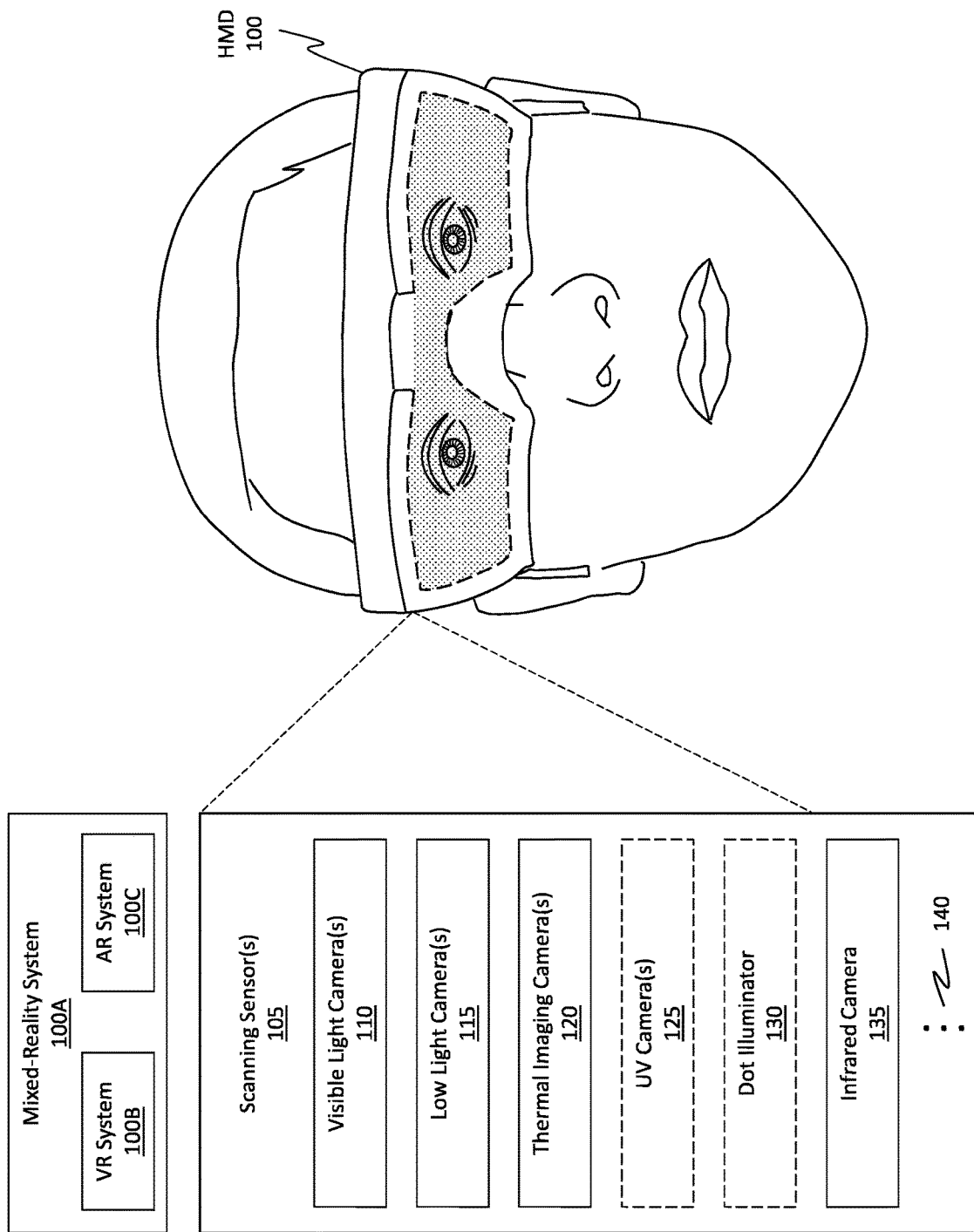
FIG. 1 illustrates an example head mounted device (HMD) configured to perform the disclosed operations.

Embodiments disclosed herein relate to systems, devices, and methods for aligning image content. The alignment is performed by concurrently identifying corner and line features and by aligning the images based on those features. As a result of performing the disclosed operations, the embodiments can use relaxed constraints during the alignment process as compared to constraints that are required when aligning the images using only the corner features.

Some embodiments acquire a first image generated by a first camera and a second image generated by a second camera. A first set of pixels that correspond to corner features are detected within the images. In parallel, a second set of pixels that correspond to line features are detected within the images. The embodiments align image content from the two images. The aligning process is performed using at least some of the pixels from the first and second sets.

In some embodiments, the alignment is performed by concurrently identifying unambiguous features that are uniquely identifiable within the images and identifying potentially ambiguous features that are susceptible to aperture ambiguity. The alignment is based on a combination of the unambiguous features and the potentially ambiguous features, thereby resulting in relaxed constraints during the alignment process.

Some embodiments acquire a first image and a second image. The embodiments perform a first detection operation. This operation includes detecting pixels that correspond to unambiguous features that are uniquely identifiable within the two images. During an overlapping time period in which the first detection operation occurs, the embodiments also perform a second detection operation. This second detection operation includes detecting pixels that correspond to potentially ambiguous features that are susceptible to aperture ambiguity within the two images. The embodiments then perform an alignment process in which image content from the first image is aligned with corresponding image content from the second image. The alignment process includes various reprojection operations.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

As described earlier, challenges occur when aligning image content from two different cameras. The disclosed embodiments address these challenges and provide solutions to those challenges. Beneficially, the embodiments provide techniques that, when practiced, result in improved success with regard to aligning image content and performing feature matching. Additionally, the embodiments can relax various constraints that might otherwise be used.

As a result of performing these operations, the user's experience is significantly improved, thereby leading to an improvement in the technology. Improved image alignment and visualization are also achieved. Accordingly, these and numerous other benefits will be described throughout the remaining portions of this disclosure.

Example MR Systems and HMDs

Attention will now be directed to FIG. 1, which illustrates an example of a head mounted device (HMD) 100. HMD 100 can be any type of MR system 100A, including a VR system 100B or an AR system 100C. It should be noted that while a substantial portion of this disclosure is focused on the use of an HMD, the embodiments are not limited to being practiced using only an HMD. That is, any type of camera system can be used, even camera systems entirely removed or separate from an HMD. As such, the disclosed principles should be interpreted broadly to encompass any type of camera use scenario. Some embodiments may even refrain from actively using a camera themselves and may simply use the data generated by a camera. For instance, some embodiments may at least be partially practiced in a cloud computing environment.

HMD 100 is shown as including scanning sensor(s) 105 (i.e. a type of scanning or camera system), and HMD 100 can use the scanning sensor(s) 105 to scan environments, map environments, capture environmental data, and/or generate any kind of images of the environment (e.g., by generating a 3D representation of the environment or by generating a "passthrough" visualization). Scanning sensor (s) 105 may comprise any number or any type of scanning devices, without limit.

In accordance with the disclosed embodiments, the HMD 100 may be used to generate a passthrough visualizations of the user's environment. As used herein, a "passthrough" visualization refers to a visualization that reflects the perspective of the environment from the user's point of view. To generate this passthrough visualization, the HMD 100 may use its scanning sensor(s) 105 to scan, map, or otherwise record its surrounding environment, including any objects in the environment, and to pass that data on to the user to view. As will be described shortly, various transformations may be applied to the images prior to displaying them to the user to ensure the displayed perspective matches the user's expected perspective.

To generate a passthrough image, the scanning sensor(s) 105 typically rely on its cameras (e.g., head tracking cameras, hand tracking cameras, depth cameras, or any other type of camera) to obtain one or more raw images (aka "texture images") of the environment. In addition to generating passthrough images, these raw images may also be used to determine depth data detailing the distance from the sensor to any objects captured by the raw images (e.g., a z-axis range or measurement). Once these raw images are obtained, then a depth map can be computed from the depth data embedded or included within the raw images (e.g., based on pixel disparities), and passthrough images can be generated (e.g., one for each pupil) using the depth map for any reprojections, if needed.

From the passthrough visualizations, a user will be able to perceive what is currently in his/her environment without having to remove or reposition the HMD 100. Furthermore, as will be described in more detail later, the disclosed passthrough visualizations can also enhance the user's ability to view objects within his/her environment (e.g., by displaying additional environmental conditions that may not have been detectable by a human eye). As used herein, a so-called "overlaid image" can be a type of passthrough image.

It should be noted that while the majority of this disclosure focuses on generating "a" passthrough image, the embodiments actually generate a separate passthrough image for each one of the user's eyes. That is, two passthrough images are typically generated concurrently with one another. Therefore, while frequent reference is made to generating what seems to be a single passthrough image, the embodiments are actually able to simultaneously generate multiple passthrough images.

In some embodiments, scanning sensor(s) 105 include visible light camera(s) 110, low light camera(s) 115, thermal imaging camera(s) 120, potentially (though not necessarily, as represented by the dotted box in FIG. 1) ultraviolet (UV) camera(s) 125, potentially (though not necessarily, as represented by the dotted box) a dot illuminator 130, and even an infrared camera 135. The ellipsis 140 demonstrates how any other type of camera or camera system (e.g., depth cameras, time of flight cameras, virtual cameras, depth lasers, etc.) may be included among the scanning sensor(s) 105.

As an example, a camera structured to detect mid-infrared wavelengths may be included within the scanning sensor(s) 105. As another example, any number of virtual cameras that are reprojected from an actual camera may be included among the scanning sensor(s) 105 and may be used to generate a stereo pair of images. In this manner, the scanning sensor(s) 105 may be used to generate the stereo pair of images. In some cases, the stereo pair of images may be obtained or generated as a result of performing any one or more of the following operations: active stereo image generation via use of two cameras and one dot illuminator (e.g., dot illuminator 130); passive stereo image generation via use of two cameras; image generation using structured light via use of one actual camera, one virtual camera, and one dot illuminator (e.g., dot illuminator 130); or image generation using a time of flight (TOF) sensor in which a baseline is present between a depth laser and a corresponding camera and in which a field of view (FOV) of the corresponding camera is offset relative to a field of illumination of the depth laser.

The visible light camera(s) 110 are typically stereoscopic cameras, meaning that the fields of view of the two or more visible light cameras at least partially overlap with one another. With this overlapping region, images generated by the visible light camera(s) 110 can be used to identify disparities between certain pixels that commonly represent an object captured by both images. Based on these pixel disparities, the embodiments are able to determine depths for objects located within the overlapping region (i.e. "stereoscopic depth matching" or "stereo depth matching"). As such, the visible light camera(s) 110 can be used to not only generate passthrough visualizations, but they can also be used to determine object depth. In some embodiments, the visible light camera(s) 110 can capture both visible light and IR light.

It should be noted that any number of cameras may be provided on the HMD 100 for each of the different camera types (aka modalities). That is, the visible light camera(s) 110 may include 1, 2, 3, 4, 5, 6, 7, 8, 9, 10, or more than 10 cameras. Often, however, the number of cameras is at least 2 so the HMD 100 can perform passthrough image generation and/or stereoscopic depth matching, as described earlier. Similarly, the low light camera(s) 115, the thermal imaging camera(s) 120, and the UV camera(s) 125 may each respectively include 1, 2, 3, 4, 5, 6, 7, 8, 9, 10, or more than 10 corresponding cameras.

Figure 2:
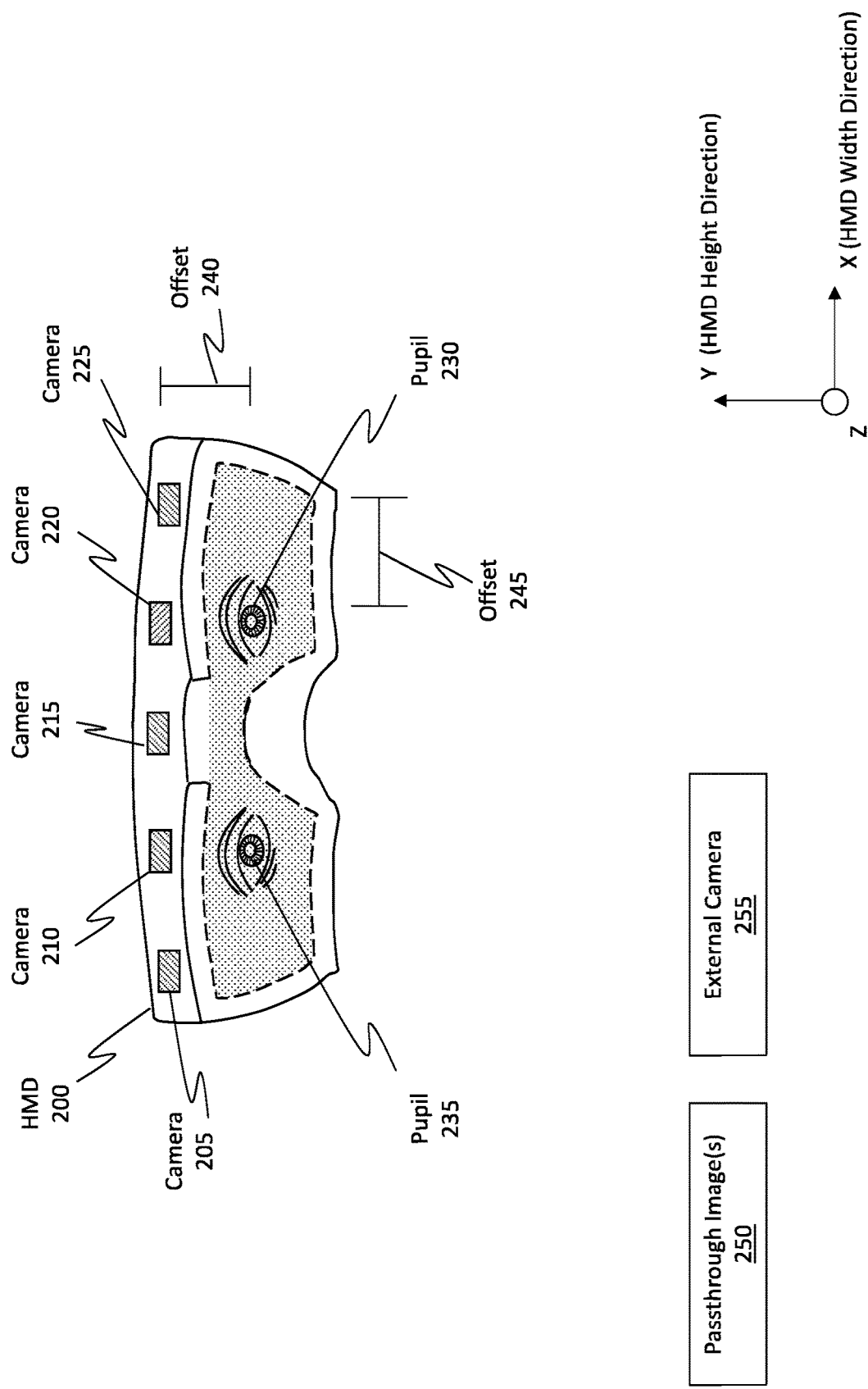
FIG. 2 illustrates another configuration of an HMD.

FIG. 2 illustrates an example HMD 200, which is representative of the HMD 100 from FIG. 1. HMD 200 is shown as including multiple different cameras, including cameras 205, 210, 215, 220, and 225. Cameras 205-225 are representative of any number or combination of the visible light camera(s) 110, the low light camera(s) 115, the thermal imaging camera(s) 120, and the UV camera(s) 125 from FIG. 1. While only 5 cameras are illustrated in FIG. 2, HMD 200 may include more or less than 5 cameras. Any one of those cameras can be referred to as a "system camera."

In some cases, the cameras can be located at specific positions on the HMD 200. In some cases, a first camera (e.g., perhaps camera 220) is disposed on the HMD 200 at a position above a designated left eye position of a user who wears the HMD 200 relative to a height direction of the HMD. For example, the camera 220 is positioned above the pupil 230. As another example, the first camera (e.g., camera 220) is additionally positioned above the designated left eye position relative to a width direction of the HMD. That is, the camera 220 is positioned not only above the pupil 230 but also in-line relative to the pupil 230. When a VR system is used, a camera may be placed directly in front of the designated left eye position. With reference to FIG. 2, a camera may be physically disposed on the HMD 200 at a position in front of the pupil 230 in the z-axis direction.

When a second camera is provided (e.g., perhaps camera 210), the second camera may be disposed on the HMD 200 at a position above a designated right eye position of a user who wears the HMD relative to the height direction of the HMD. For example, the camera 210 is above the pupil 235. In some cases, the second camera is additionally positioned above the designated right eye position relative to the width direction of the HMD. When a VR system is used, a camera may be placed directly in front of the designated right eye position. With reference to FIG. 2, a camera may be physically disposed on the HMD 200 at a position in front of the pupil 235 in the z-axis direction.

When a user wears HMD 200, HMD 200 fits over the user's head and the HMD 200's display is positioned in front of the user's pupils, such as pupil 230 and pupil 235. Often, the cameras 205-225 will be physically offset some distance from the user's pupils 230 and 235. For instance, there may be a vertical offset in the HMD height direction (i.e. the "Y" axis), as shown by offset 240. Similarly, there may be a horizontal offset in the HMD width direction (i.e. the "X" axis), as shown by offset 245.

HMD 200 is configured to provide passthrough image(s) 250 for the user of HMD 200 to view. In doing so, HMD 200 is able to provide a visualization of the real world without requiring the user to remove or reposition HMD 200. These passthrough image(s) 250 effectively represent the view of the environment from the HMD's perspective. Cameras 205-225 are used to provide these passthrough image(s) 250. The offset (e.g., offset 240 and 245) between the cameras and the user's pupils results in parallax. In order to provide these passthrough image(s) 250, the embodiments can perform parallax correction by applying various transformations and reprojections on the images in order to change the initial perspective represented by an image into a perspective matches that of the user's pupils. Parallax correction relies on the use of a depth map in order to make the reprojections.

In some implementations, the embodiments utilize a planar reprojection process to correct parallax when generating the passthrough images as opposed to performing a full three-dimensional reprojection. Using this planar reprojection process is acceptable when objects in the environment are sufficiently far away from the HMD. Thus, in some cases, the embodiments are able to refrain from performing three-dimensional parallax correction because the objects in the environment are sufficiently far away and because that distance results in a negligible error with regard to depth visualizations or parallax issues.

Any of the cameras 205-225 constitute what is referred to as a "system camera" because they are integrated parts of the HMD 200. In contrast, the external camera 255 is physically separate and detached from the HMD 200 but can communicate wirelessly with the HMD 200. As will be described shortly, it is desirable to align images (or image content) generated by the external camera 255 with images (or image content) generated by a system camera to then generate an overlaid image, which can operate as a passthrough image. Often, the angular resolution of the external camera 255 is higher (i.e. more pixels per degree and not just more pixels) than the angular resolution of the system camera, so the resulting overlaid image provides enhanced image content beyond that which is available from using only the system camera image. Additionally, or alternatively, the modalities of the external camera 255 and the system camera may be different, so the resulting overlaid image can also include enhanced information. As an example, suppose the external camera 255 is a thermal imaging camera. The resulting overlaid image can, therefore, include visible light image content and thermal image content. Accordingly, providing an overlaid passthrough image is highly desirable. It should be noted that the external camera 255 may be any of the camera types listed earlier. Additionally, there may be any number of external cameras, without limit.

Example Scenarios

Figure 3:
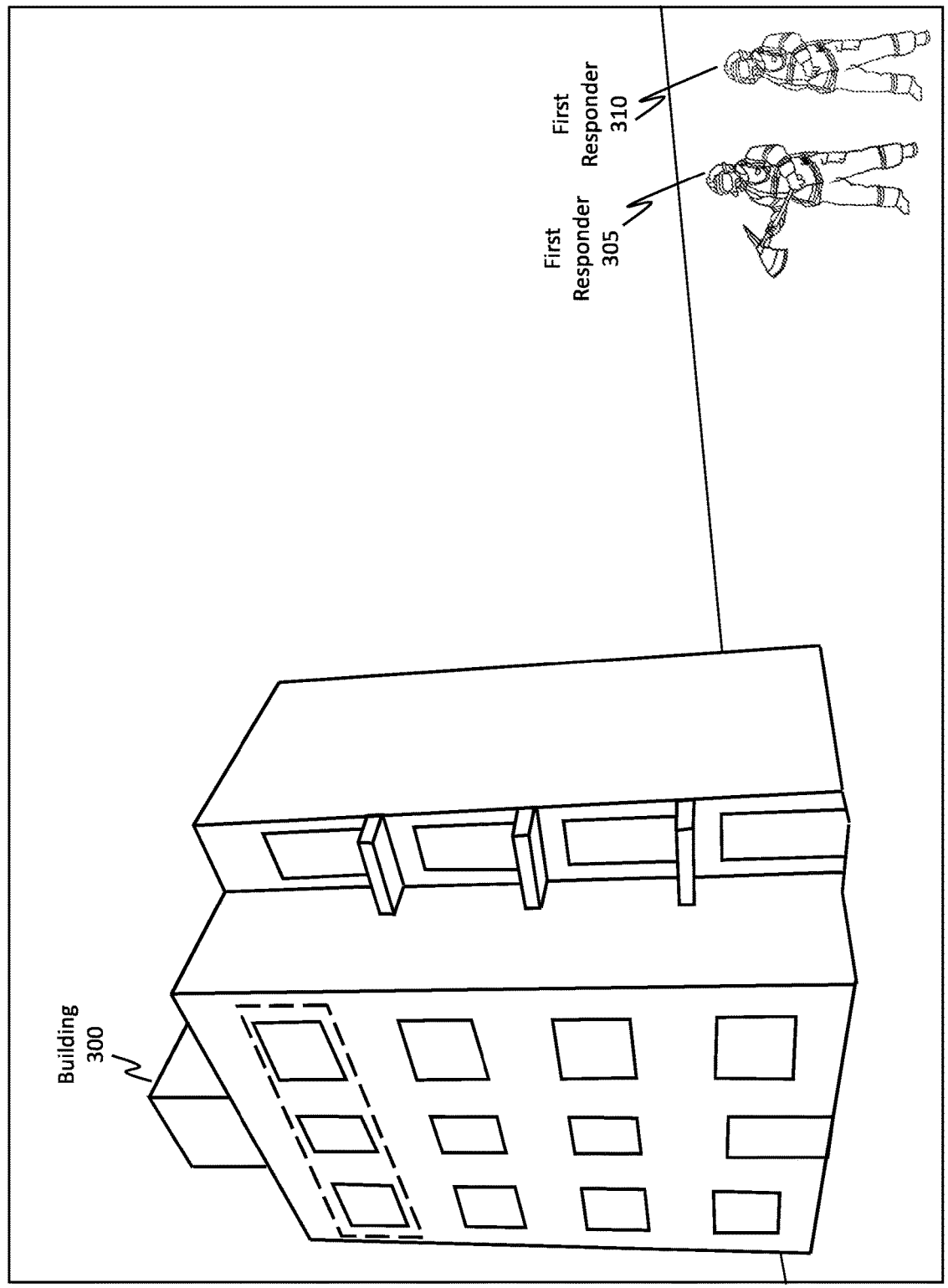
FIG. 3 illustrates an example scenario in which the disclosed principles may be practiced.
Figure 4:
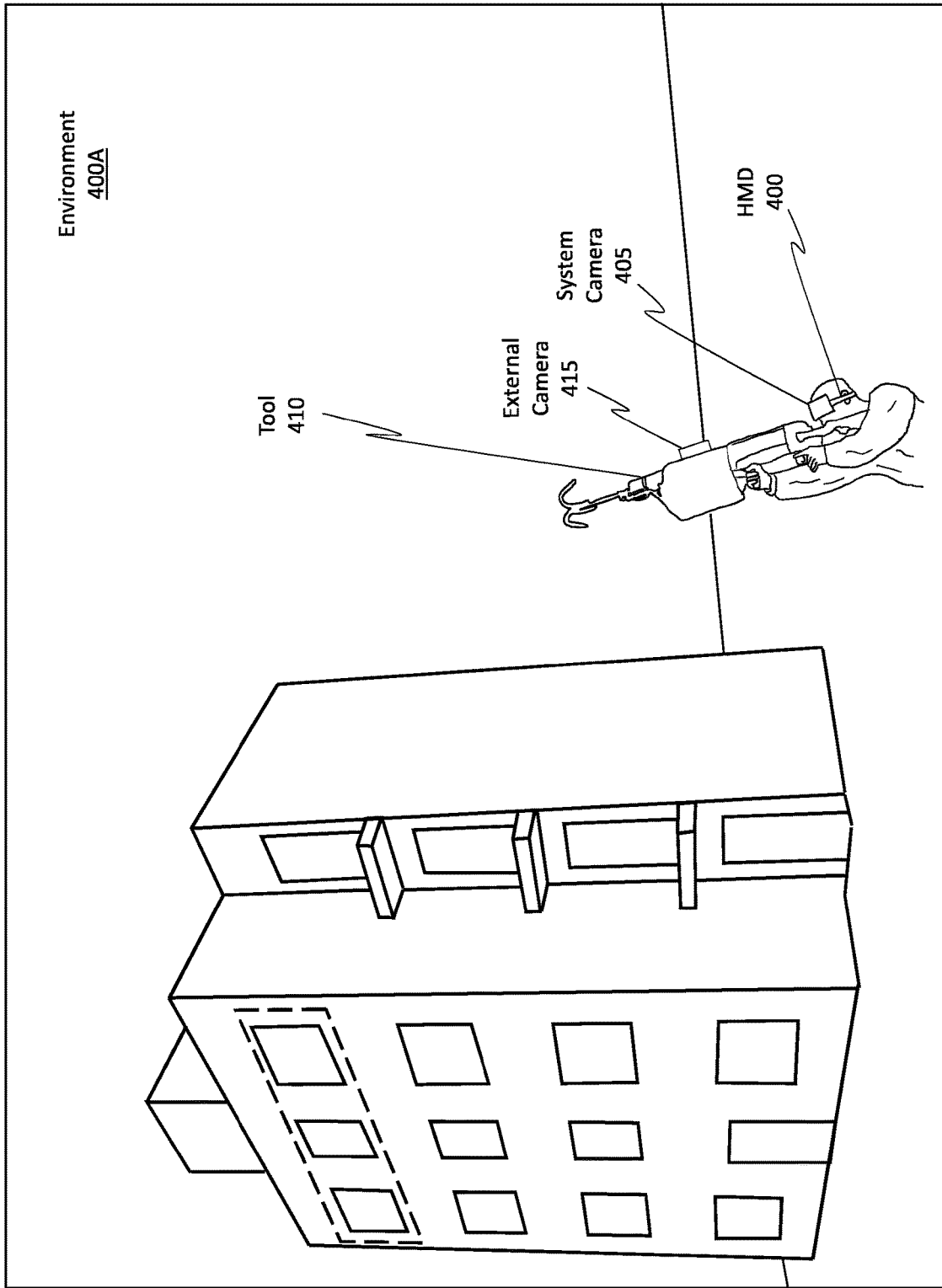
FIG. 4 illustrates another example scenario.

Attention will now be directed to FIG. 3, which illustrates an example scenario in which the HMDs discussed in FIGS. 1 and 2 may be used. FIG. 3 shows a building 300 and a first responder 305 and another first responder 310. In this example scenario, the first responders 305 and 310 are desirous to scale the building 300. FIG. 4 shows one example technique for performing this scaling feat.

FIG. 4 shows a first responder wearing an HMD 400, which is representative of the HMDs discussed thus far, in an environment 400A. HMD 400 includes a system camera 405, as discussed previously. Furthermore, the first responder is using a tool 410 that includes an external camera 415, which is representative of the external camera 255 of FIG. 2. In this case, the tool 410 is a grappling gun that will be used to shoot a rope and hook onto the building to allow the first responder to scale the building. By aligning the image content generated by the external camera 415 with the image content generated by the system camera 405, the user will be able to better discern where the tool 410 is being aimed.

Figure 5:
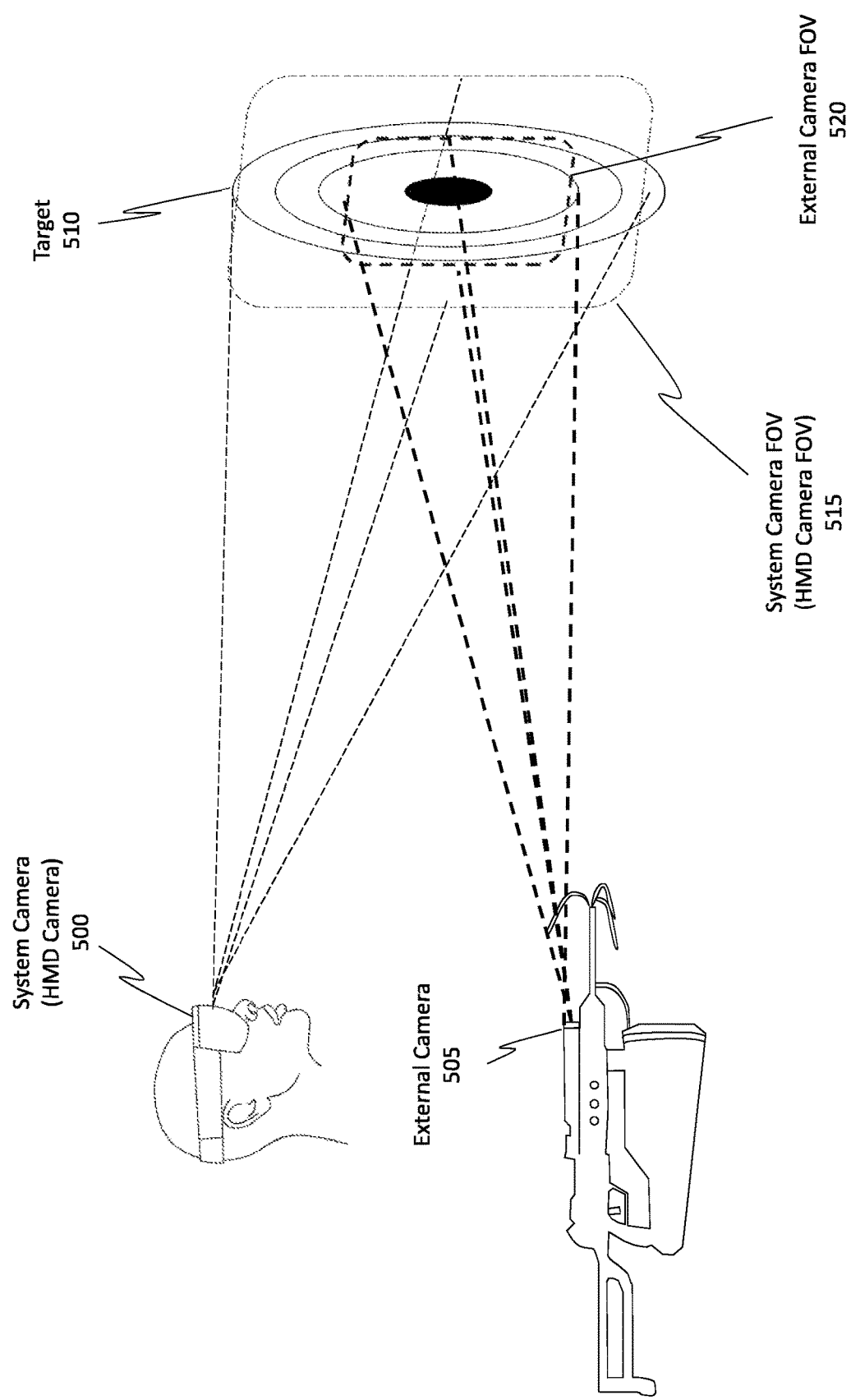
FIG. 5 illustrates how a system camera and an external camera can be used to perform the disclosed operations.

That is, in accordance with the disclosed principles, it is desirable to provide an improved platform or technique by which a user (e.g., the first responders) can aim a tool (e.g., the tool 410) using the HMD 400, the system camera 405, and the external camera 415 as a combined aiming interface. FIG. 5 shows one such example.

FIG. 5 shows a system camera 500 (aka HMD camera) mounted on an HMD, where the system camera 500 is representative of the system camera 405 of FIG. 4, and a tool (e.g., a grappling gun) that includes an external camera 505, which is representative of the external camera 415. It should be noted how the optical axis of the external camera 505 is aligned with the aiming direction of the tool. As a consequence, the images generated by the external camera 505 can be used to determine where the tool is being aimed. One will appreciate how the tool can be any type of aimable tool, without limit.

In FIG. 5, both the system camera 500 and the external camera 505 are being aimed at a target 510. To illustrate, the field of view (FOV) of the system camera 500 is represented by the system camera FOV 515 (aka HMD camera FOV), and the FOV of the external camera 505 is represented by the external camera FOV 520. Notice, the system camera FOV 515 is larger than the external camera FOV 520. Typically, the external camera 505 provides a very focused view, similar to that of a scope (i.e. a high level of angular resolution). As will be discussed in more detail later, the external camera 505 sacrifices a wide FOV for an increased resolution and increased pixel density. Accordingly, in this example scenario, one can observe how in at least some situations, the external camera FOV 520 may be entirely overlapped or encompassed by the system camera FOV 515. Of course, in the event the user aims the external camera 505 in a direction where the system camera 500 is not aimed at, then the system camera FOV 515 and the external camera FOV 520 will not overlap.

Figure 6:
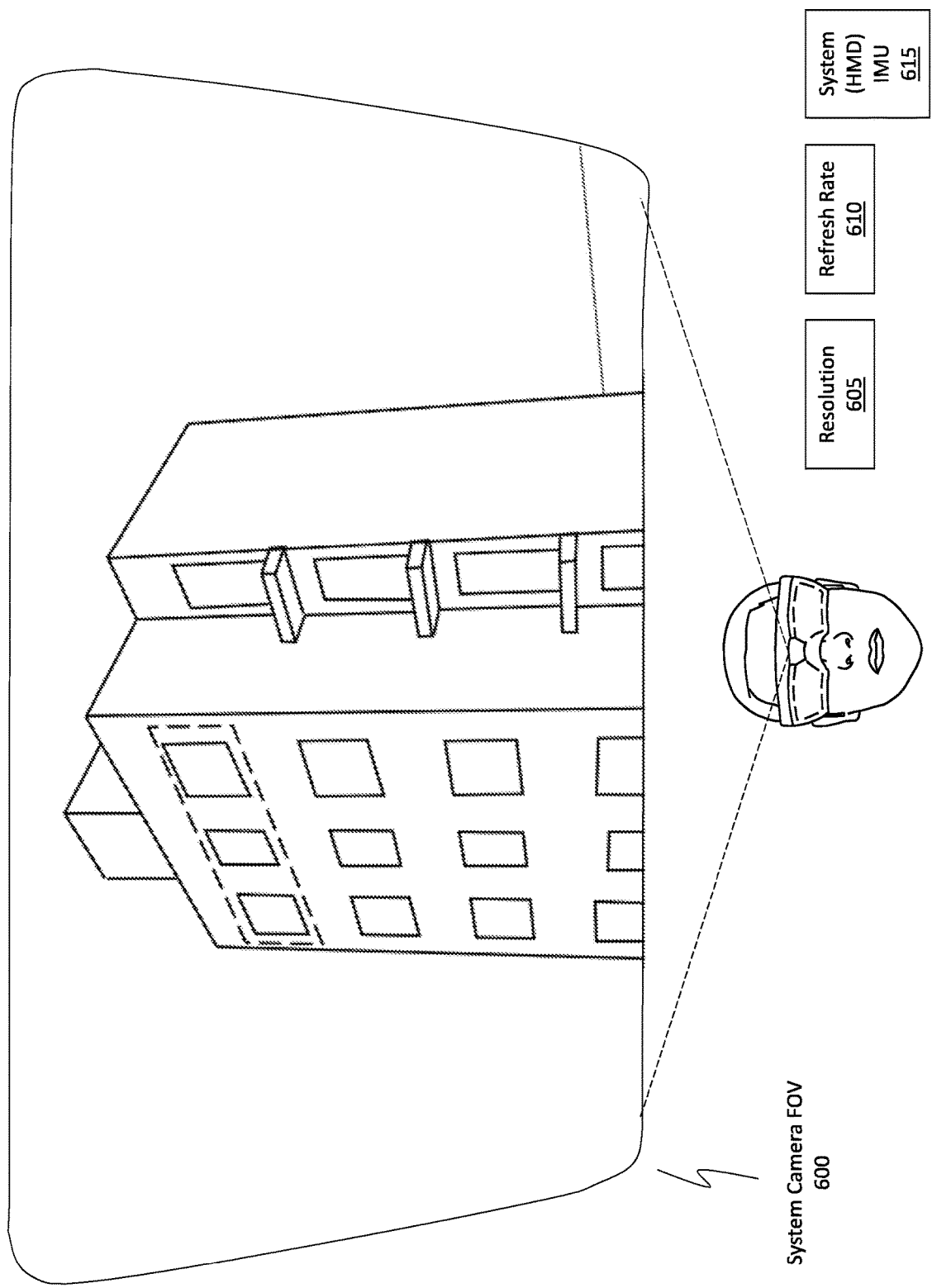
FIG. 6 illustrates the field of view (FOV) of a system camera.

FIG. 6 shows the system camera FOV 600, which is representative of the system camera FOV 515 of FIG. 5. The system camera FOV 600 will be captured by the system camera in the form of a system camera image and will potentially be displayed in the form of a passthrough image. The system camera images have a resolution 605 and are captured by the system camera based on a determined refresh rate 610 of the system camera. The refresh rate 610 of the system camera is typically between about 30 Hz and 120 Hz. Often, the refresh rate 610 is around 90 Hz or at least 60 Hz. Often, the system camera FOV 600 has at least a 55 degree horizontal FOV. The horizontal baseline of the system camera FOV 600 may extend to 65 degrees, or even beyond 65 degrees.

It should also be noted how the HMD includes a system (HMD) inertial measurement unit IMU 615. An IMU (e.g., system IMU 615) is a type of device that measures forces, angular rates, and orientations of a body. An IMU can use a combination of accelerometers, magnetometers, and gyroscopes to detect these forces. Because both the system camera and the system IMU 615 are integrated with the HMD, the system IMU 615 can be used to determine the orientation or pose of the system camera (and the HMD) as well as any forces the system camera is being subjected to.

In some cases, the "pose" may include information detailing the 6 degrees of freedom, or "6 DOF," information. Generally, the 6 DOF pose refers to the movement or position of an object in three-dimensional space. The 6 DOF pose includes surge (i.e. forward and backward in the x-axis direction), heave (i.e. up and down in the z-axis direction), and sway (i.e. left and right in the y-axis direction). In this regard, 6 DOF pose refers to the combination of 3 translations and 3 rotations. Any possible movement of a body can be expressed using the 6 DOF pose.

In some cases, the pose may include information detailing the 3 DOF pose. Generally, the 3 DOF pose refers to tracking rotational motion only, such as pitch (i.e. the transverse axis), yaw (i.e. the normal axis), and roll (i.e. the longitudinal axis). The 3 DOF pose allows the HMD to track rotational motion but not translational movement of itself and of the system camera. As a further explanation, the 3 DOF pose allows the HMD to determine whether a user (who is wearing the HMD) is looking left or right, whether the user is rotating his/her head up or down, or whether the user is pivoting left or right. In contrast to the 6 DOF pose, when 3 DOF pose is used, the HMD is not able to determine whether the user (or system camera) has moved in a translational manner, such as by moving to a new location in the environment.

Determining the 6 DOF pose and the 3 DOF pose can be performed using inbuilt sensors, such as accelerometers, gyroscopes, and magnetometers (i.e. the system IMU 615). Determining the 6 DOF pose can also be performed using positional tracking sensors, such as head tracking sensors. Accordingly, the system IMU 615 can be used to determine the pose of the HMD.

Figure 7:
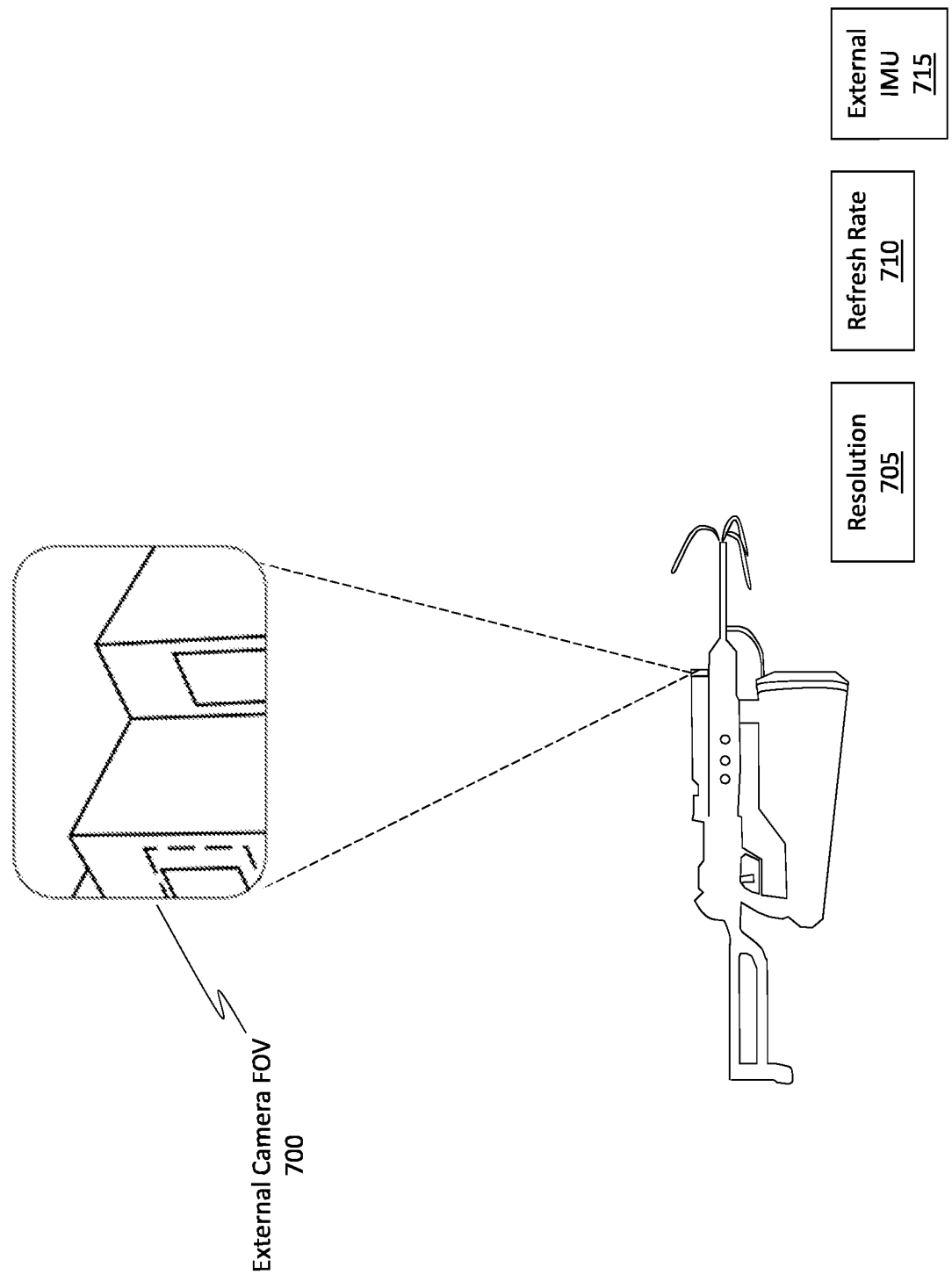
FIG. 7 illustrates the FOV of an external camera.

FIG. 7 shows an external camera FOV 700, which is representative of the external camera FOV 520 of FIG. 5. Notice, the external camera FOV 700 is smaller than the system camera FOV 600. That is, the angular resolution of the external camera FOV 700 is higher than the angular resolution of the system camera FOV 600. Having an increased angular resolution also results in the pixel density of an external camera image being higher than the pixel density of a system camera image. For instance, the pixel density of an external camera image is often 2.5 to 3 times that of the pixel density of a system camera image. As a consequence, the resolution 705 of an external camera image is higher than the resolution 605. Often, the external camera FOV 700 has at least a 19 degree horizontal FOV. That horizontal baseline may be higher, such as 20 degrees, 25 degrees, 30 degrees, or more than 30 degrees.

The external camera also has a refresh rate 710. The refresh rate 710 is typically lower than the refresh rate 610. For example, the refresh rate 710 of the external camera is often between 20 Hz and 60 Hz. Typically, the refresh rate 710 is at least about 30 Hz. The refresh rate of the system camera is often different than the refresh rate of the external camera. In some cases, however, the two refresh rates may be substantially the same.

The external camera also includes or is associated with an external IMU 715. Using this external IMU 715, the embodiments are able to detect or determine the orientation/pose of the external camera as well as any forces that the external camera is being subjected to. Accordingly, similar to the earlier discussion, the external IMU 715 can be used to determine the pose (e.g., 6 DOF and/or 3 DOF) of the external camera sight.

In accordance with the disclosed principles, it is desirable to overlap and align the images obtained from the external camera with the images generated by the system camera to generate an overlaid and aligned passthrough image. The overlap between the two images enables the embodiments to generate multiple images and then overlay image content from one image onto another image in order to generate a composite image or an overlaid image having enhanced features that would not be present if only a single image were used. As one example, the system camera image provides a broad FOV while the external camera image provides high resolution and pixel density for a focused area (i.e. the aiming area where the tool is being aimed). By combining the two images, the resulting image will have the benefits of a broad FOV and a high pixel density for the aiming area.

It should be noted that while this disclosure primarily focuses on the use of two images (e.g., the system camera image and the external camera image), the embodiments are able to align content from more than two images having overlapping regions. For instance, suppose 2, 3, 4, 5, 6, 7, 8, 9, or even 10 integrated and/or detached cameras have overlapping FOVs. The embodiments are able to examine each resulting image and then align specific portions with one another. The resulting overlaid image may then be a composite image formed from any combination or alignment of the available images (e.g., even 10 or more images, if available). Accordingly, the embodiments are able to utilize any number of images when performing the disclosed operations and are not limited to only two images or two cameras.

Figure 8:
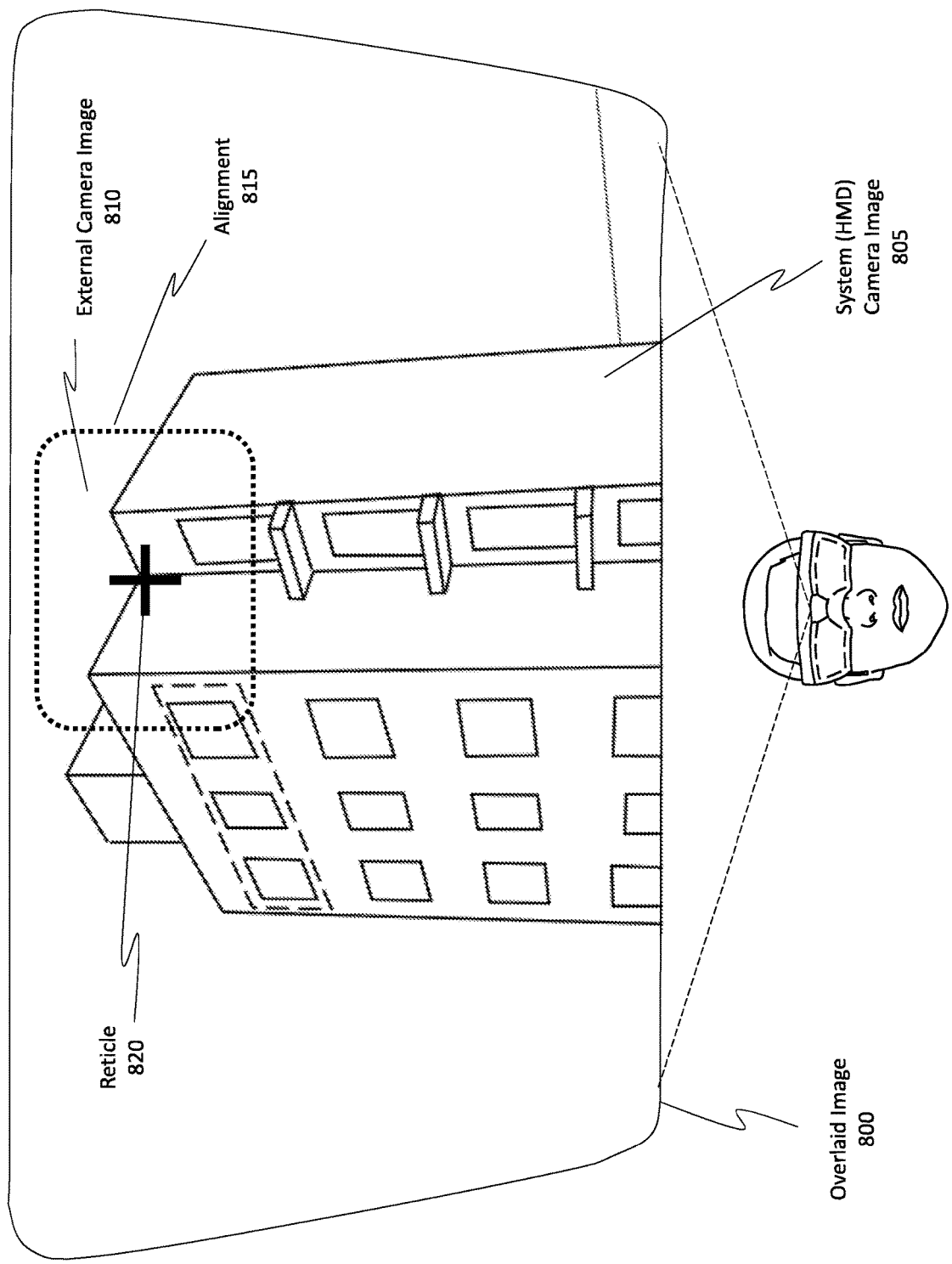
FIG. 8 illustrates an overlaid and aligned image in which image content from the external camera image is overlaid onto the system camera image.

As another example, suppose the system camera is a low light camera and further suppose the external camera is a thermal imaging camera. As will be discussed in more detail later, the embodiments are able to selectively extract image content from the thermal imaging camera image and overlay that image content onto the low light camera image. In this regard, the thermal imaging content can be used to augment or supplement the low light image content, thereby providing enhanced imagery to the user. Additionally, because the external camera has increased resolution relative to the system camera, the resulting overlaid image will provide enhanced clarity for the areas where the pixels in the external camera image are overlaid onto the system camera image. FIG. 8 provides an example of these operations and benefits.

Image Correspondences and Alignment

In accordance with the disclosed principles, the embodiments are able to align the system camera's image with the external camera's image. That is, because at least a portion of the two cameras' FOVs overlap with one another, as was described earlier, at least a portion of the resulting images include corresponding content. Consequently, that corresponding content can be identified and then a merged, fused, or overlaid image can be generated based on the similar corresponding content. By generating this overlaid image, the embodiments are able to provide enhanced image content to the user, which enhanced image content would not be available if only a single image type were provided to a user. Both the system camera's image and the external camera's images may be referred to as "texture" images.

Different techniques can be used to perform the alignment. One technique is the "visual alignment" technique involving the detection of feature points. Another technique is the IMU-based technique that aligns images based on determined poses of the respective cameras. The visual alignment technique usually produces more accurate results.

Regarding the visual alignment technique, to merge or align the images, some embodiments are able to analyze the texture images (e.g., perform computer vision feature detection) in an attempt to find any number of feature points. As used herein, the phrase "feature detection" generally refers to the process of computing image abstractions and then determining whether an image feature (e.g., of a particular type) is present at any particular point or pixel in the image. Often, corners (e.g., the corners of a wall), distinguishable edges (e.g., the edge of a table), or ridges are used as feature points because of the inherent or sharp contrasting visualization of an edge or corner.

Any type of feature detector may be programmed to identify feature points. In some cases, the feature detector may be a machine learning algorithm. As used herein, reference to any type of machine learning may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In accordance with the disclosed principles, the embodiments detect any number of feature points (e.g., 1, 2, 3, 4, 5, 6, 7, 8, 9, 10, 20, 30, 40, 50, 60, 70, 80, 90, 100, 200, 500, 1,000, 2,000, or more than 2,000) and then attempt to identify correlations or correspondences between the feature points detected in the system camera image and the feature points identified in the external camera image. As will be described in more detail later, some examples of a feature point include corners (aka corner features) and lines (aka line features).

Some embodiments then fit the feature or image correspondence(s) to a motion model in order to overlay one image onto another image to form an enhanced overlaid image. Any type of motion model may be used. Generally, a motion model is a type of transformation matrix that enables a model, a known scene, or an object to be projected onto a different model, scene, or object. The feature points are used as reference points when reprojecting the images.

In some cases, the motion model may simply be a rotational motion model. With a rotational model, the embodiments are able to shift one image by any number of pixels (e.g., perhaps 5 pixels to the left and 10 pixels up) in order to overlay one image onto another image. For instance, once the image correspondences are identified, the embodiments can identify the pixel coordinates of those feature points or correspondences. Once the coordinates are identified, then the embodiments can overlay the external camera sight's image onto the HMD camera's image using the rotational motion model approach described above.

In some cases, the motion model may be more complex, such as in the form of a similarity transform model. The similarity transform model may be configured to allow for (i) rotation of either one of the HMD camera's image or the external camera sight's image, (ii) scaling of those images, or (iii) homographic transformations of those images. In this regard, the similarity transform model approach may be used to overlay image content from one image onto another image. Accordingly, in some cases, the process of aligning the external camera image with the system camera image is performed by (i) identifying image correspondences between the images and then, (ii) based on the identified image correspondences, fitting the correspondences to a motion model such that the external camera image is projected onto the system camera image.

Another technique for aligning images includes using IMU data to predict poses of the system camera and the external camera. Once the two poses are estimated or determined, the embodiments then use those poses to align one or more portions of the images with one another. Once aligned, then one or more portions of one image (which portions are the aligned portions) are overlaid onto the corresponding portions of the other image in order to generate an enhanced overlaid image. In this regard, IMUs can be used to determine poses of the corresponding cameras, and those poses can then be used to perform the alignment processes. IMU data is almost always readily available. Sometimes, however, the visual alignment process might not be able to be performed.

FIG. 8 shows a resulting overlaid image 800 comprising portions (or all) of a system (HMD) camera image 805 (i.e. an image generated by the system camera) and an external camera image 810 (i.e. an image generated by the external camera). These images are aligned using an alignment 815 process (e.g., visual alignment, IMU-based alignment, and/or hardware-based alignment). Optionally, additional image artifacts can be included in the overlaid image 800, such as perhaps a reticle 820 used to help the user aim the tool. By aligning the image content, a user of the tool can determine where the tool is being aimed without having to look down the tool's sights. Instead, the user can discern where the tool is being aimed by simply looking at the content displayed in his/her HMD.

Figure 9:
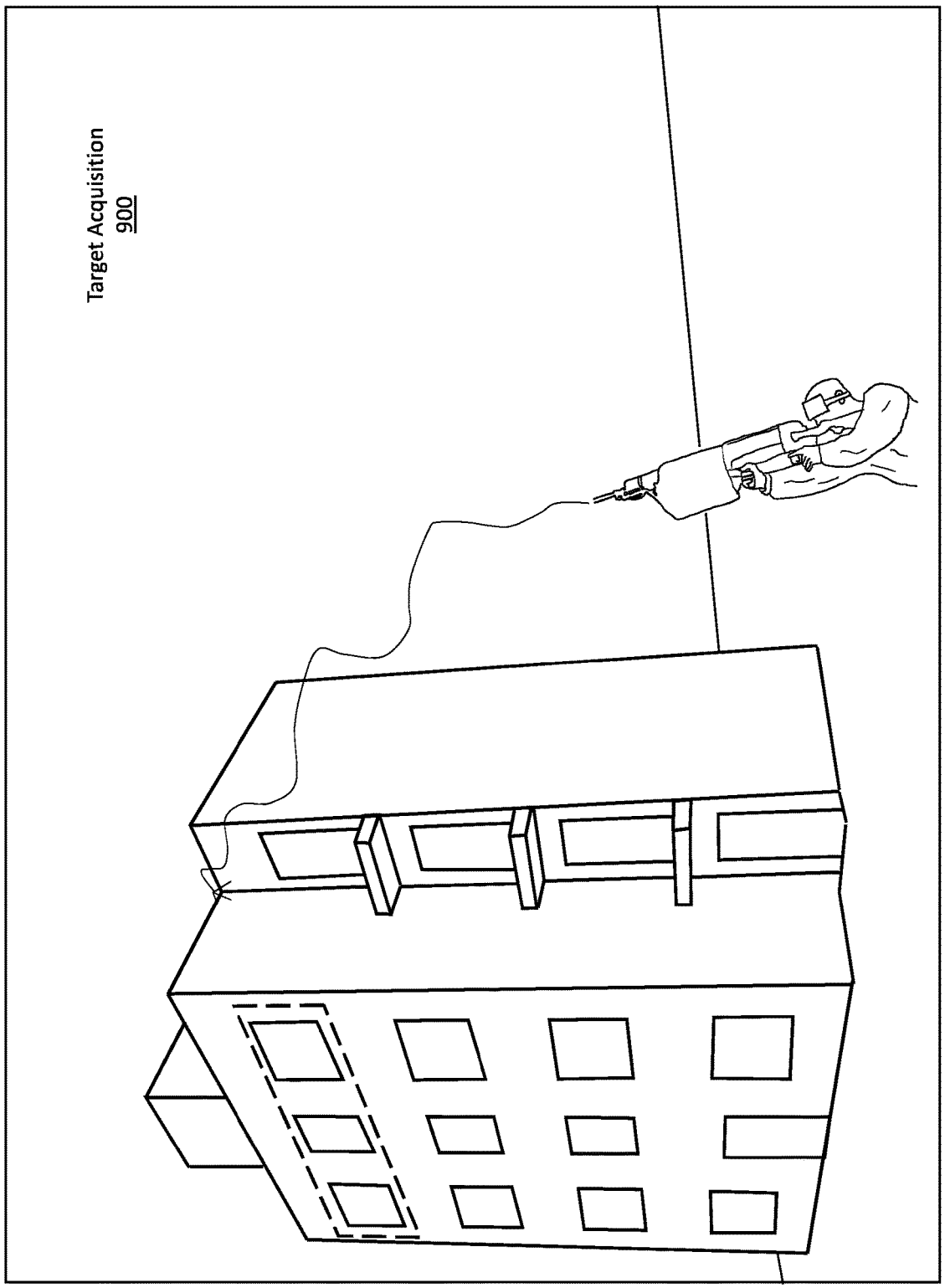
FIG. 9 illustrates another example scenario in which the principles may be practiced.

Providing the enhanced overlaid image 800 allows for rapid target acquisition, as shown by target acquisition 900 in FIG. 9. That is, a target can be acquired (i.e. the tool is accurately aimed at a desired target) in a fast manner because the user no longer has to take time to look through the tool's sights.

Visual Alignment Approach

Figure 10:
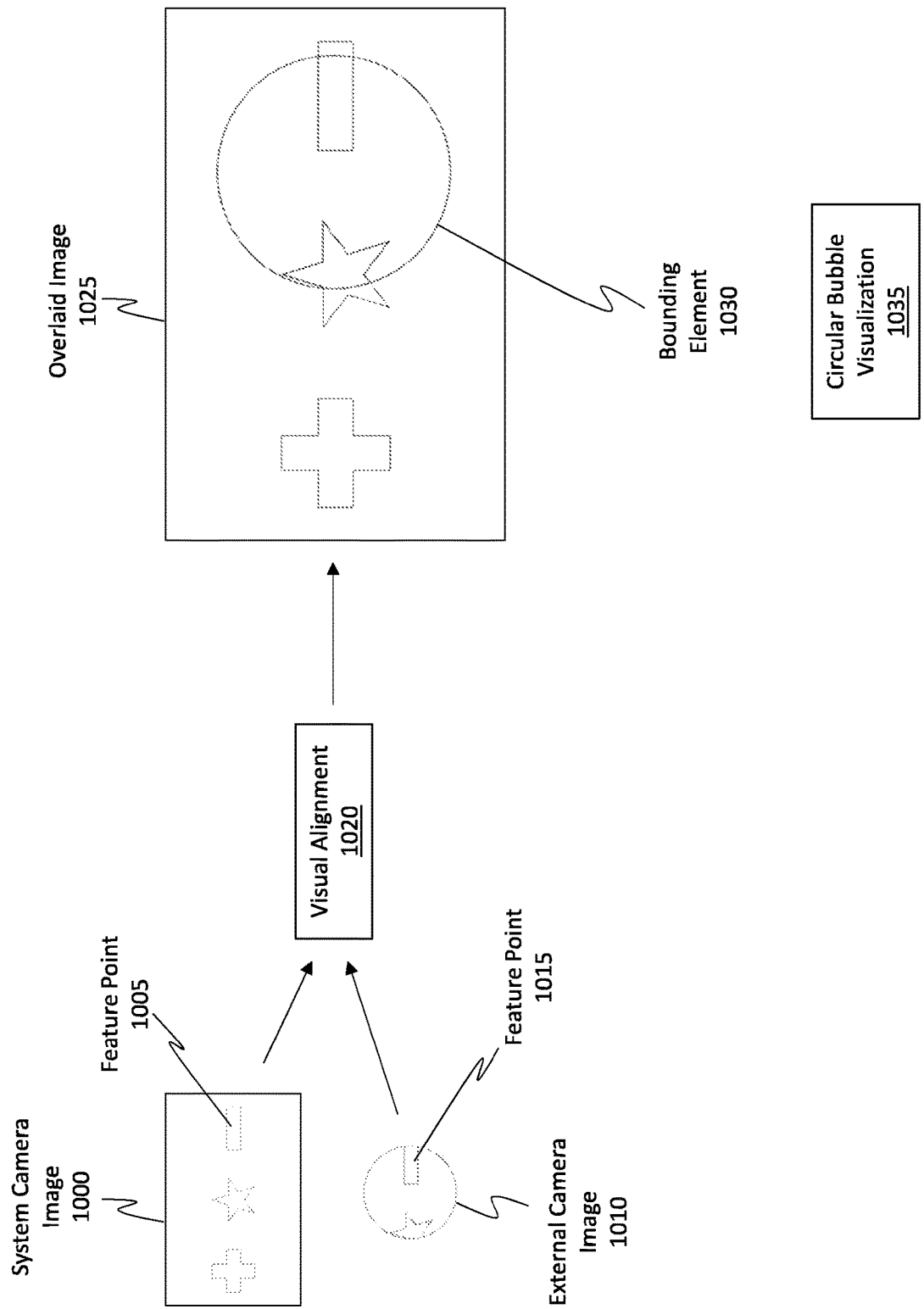
FIG. 10 illustrates how an external camera image can be overlaid onto a system camera image using a visual alignment process and how a bounding element can be displayed in a manner so as to surround the content from the external camera image.

FIG. 10 shows an abstracted version of the images discussed thus far and is focused on the visual alignment approach. In particular, FIG. 10 shows a system camera image 1000 having a feature point 1005 and an external camera image 1010 having a feature point 1015 that corresponds to the feature point 1005. The embodiments are able to perform a visual alignment 1020 between the system camera image 1000 and the external camera image 1010 using the feature points 1005 and 1015 in order to produce the overlaid image 1025. The overlaid image 1025 includes portions extracted or obtained from the system camera image 1000 and portions extracted or obtained from the external camera image 1010. Notice, in some embodiments, the overlaid image 1025 includes a bounding element 1030 encompassing pixels that are obtained from the external camera image 1010 and/or from the system camera image 1000. Optionally, the bounding element 1030 may be in the form of a circular bubble visualization 1035. Other shapes may be used for the bounding element 1030, however.

Using Corners and Lines to Perform Alignment

In accordance with the disclosed principles, the embodiments are able to perform a visual alignment process to align image content from multiple different images, where this visual alignment process is dependent on a combination of corner features and line features that are present in the images. As will be discussed in more detail later, although using a corner-only approach can avoid certain problems (e.g., an aperture problem), the process of identifying corners in an image and then aligning images based on those identified corners can be a time consuming and compute-intensive operation. What is needed, therefore, is an improved technique that is more efficient and that results in better feature matching. FIGS. 11 through 19 provide various illustrations on a hybrid approach that uses both corner features and line features to perform a visual alignment, where this use results in less constraints that are required during the alignment process, thereby resulting in improved computing efficiency and improved feature matching.

Figure 11:
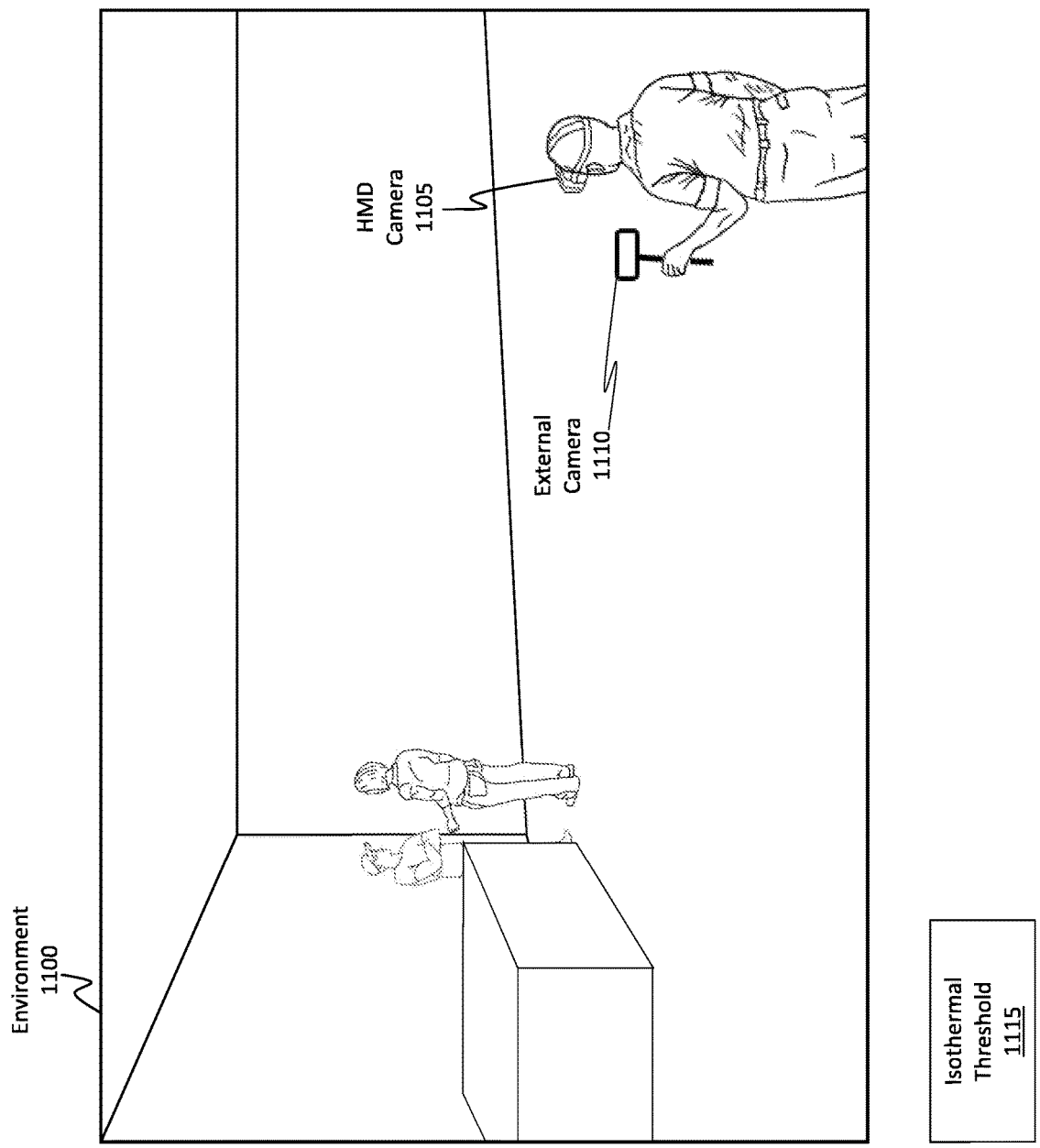
FIG. 11 illustrates an example environment in which multiple cameras are generating images.

FIG. 11 shows an example environment 1100 where a user is using an HMD camera 1105 and an external camera 1110. As discussed previously, it is desirable to align the image content generated from these two cameras. In some cases, however, the environment 1100 might be a low light environment or, alternatively, might be an environment that has a low contrast in terms of thermal gradient or contrast.

As an example, late at night after objects have cooled, the temperature gradient for the environment might be generally uniform. In such scenarios, the environment's temperature profile or gradient might be below a particular isothermal threshold 1115, where this threshold indicates that the temperatures of objects in the environment are generally quite close to one another. In such scenario, traditional techniques for aligning content can break down. The disclosed embodiments provide solutions for such scenarios.

Figure 12:
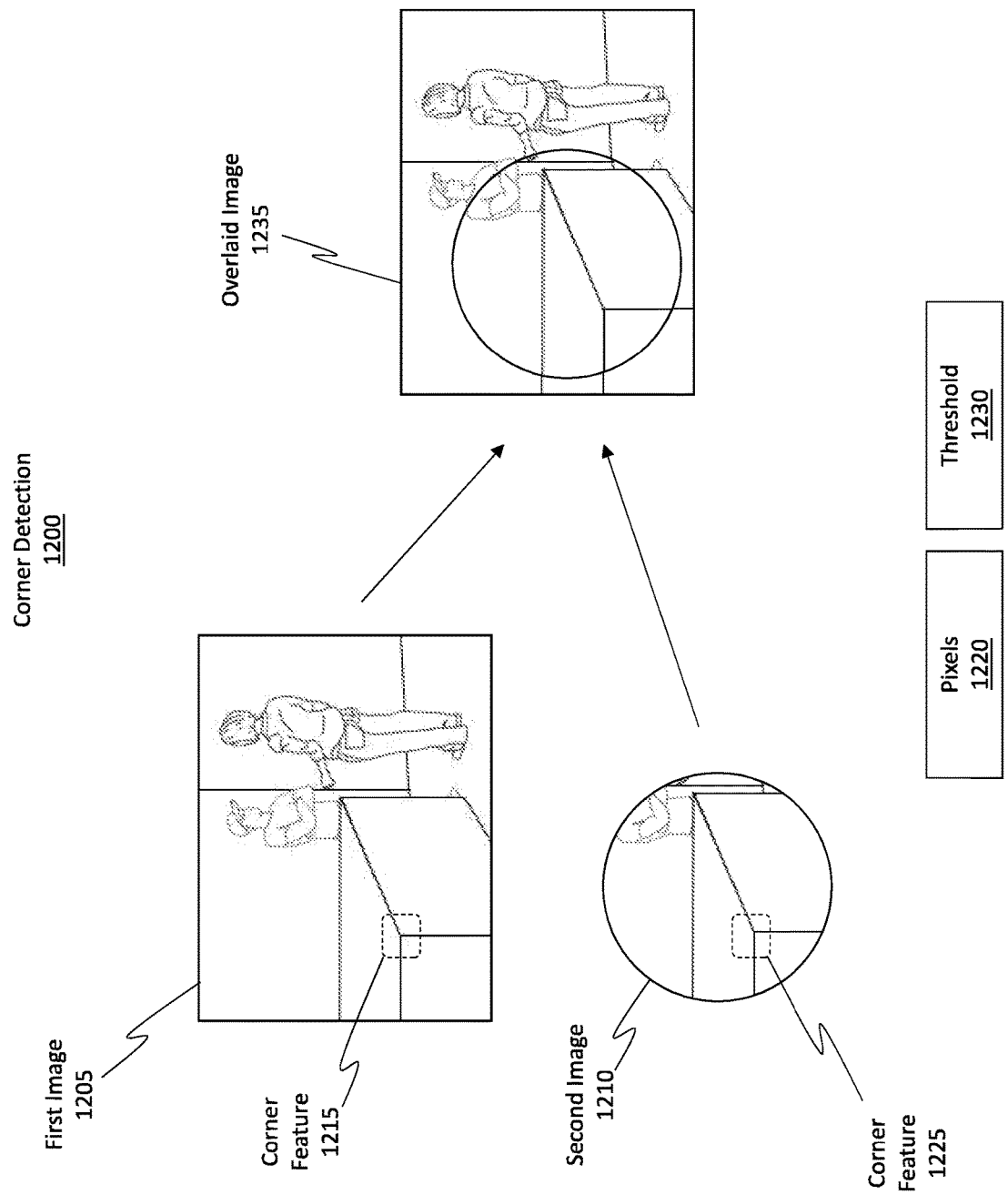
FIG. 12 illustrates an example corner detection operation.

FIG. 12 illustrates an example corner detection 1200 process that can be used to align images. FIG. 12 shows a first image 1205, which is generated by the HMD camera 1105 of FIG. 11, and a second image 1210, which is generated by the external camera 1110.

The embodiments perform a corner detection operation to identify "corners" that are present within an image. As an example, the embodiments can identify the corner feature 1215 in the first image 1205. Stated differently, a set of pixels 1220 are identified within an image, where that set of pixels are determined to correspond to a corner.

As used herein, the term "corner" refers to one or more pixels that have non-uniform intensity with a first nearby patch of pixels that are located horizontally relative to the one or more pixels and with a second nearby patch of pixels that are located vertically relative to the one or more pixels. Stated differently, a corner is defined as a set of one or more pixels that contrast with neighboring corners located in both X and Y directions relative to that set of pixels. As used herein, the term "nearby" refers to a location that is proximate to another location, such as by being within a threshold number of pixels relative to one another (e.g., perhaps 1 pixel distance, 2 pixels, 3 pixels, 4 pixels, 5 pixels, 10 pixels, 20 pixels, more than 20 pixels, or any number of pixels therebetween).

With that understanding, the embodiments identify the corner feature 1215 in the first image 1205. Additionally, the embodiments identify corner features in the second image 1210. As a result, the corner feature 1225 is identified. Notice, the corner feature 1225 corresponds to the corner feature 1215.

To align image content, the embodiments are tasked with identifying a threshold 1230 number of corners. Furthermore, a threshold number of those corners must correspond with one another. Stated differently, a number of corners identified in the first image 1205 must be identified and must correspond to a number of corners identified in the second image 1210. If those thresholds are satisfied, the embodiments can perform an image alignment operation to generate the overlaid image 1235, which is an image where content from the second image 1210 is aligned and then overlaid with corresponding content from the first image 1205.

Although the corner detection 1200 process works well, detecting and aligning corners is a compute-intensive operation and can fail if not enough corners are detected and matched between the images. For instance, it is often the case that with the corners-only approach, at least 5 corners have to be identified from one image and then matched with corresponding corners from a second image. In low thermal gradient conditions, even identifying 5 corresponding corners can be a challenge.

Figure 13:
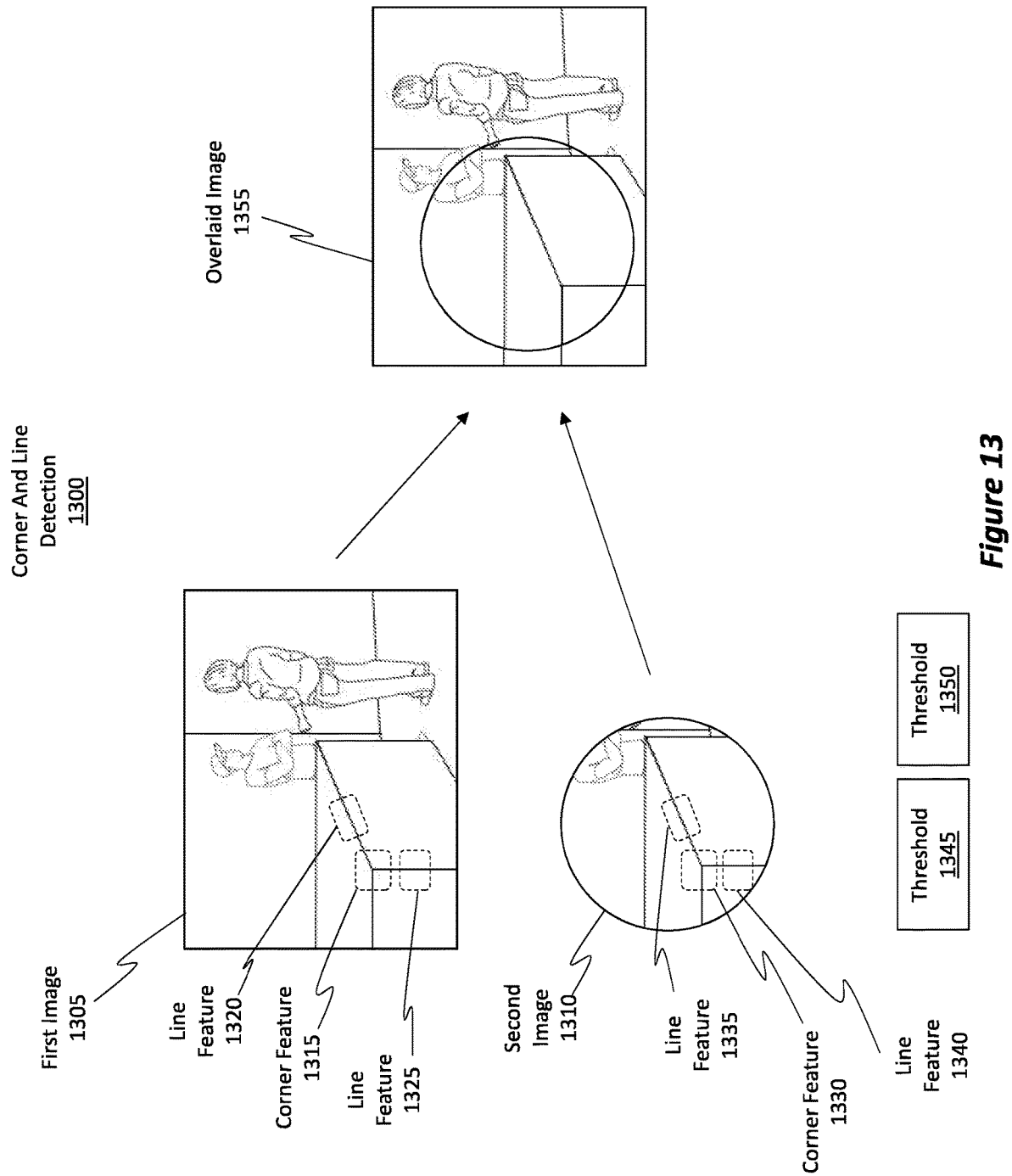
FIG. 13 illustrates a hybrid corner and line detection operation.

After identifying a sufficient number of corners, the embodiments then identify a 3D rotation using a motion model to fit the image content from the first or second image to the other image by performing various rotations and transformations in order to align the 5 corners with one another. Performing such an alignment is computationally intensive. What is desired, therefore, is a technique that reduces or relaxes the constraints that are present when following a corners-only approach (e.g., by requiring a fewer number of corners to be aligned with one another). FIG. 13 describes such a technique.

FIG. 13 shows a corner and line detection 1300 process that involves a combination of the corner detection 1200 operation of FIG. 12 as well as a line detection operation. Notably, the corner detection operation and the line detection operation are run in parallel with one another.

It is typically the case, however, that identifying corresponding "lines" in images is a simpler process, so it is often the case that the line detection process completes faster than the corner detection process. Because the two processes are run in parallel and because the line detection process is faster, adding the line detection process does not negatively impact the overall speed of the overall alignment process. That being said, by incorporating the use of lines to align the images, a fewer number of corners can be used during the alignment process, thereby resulting in relaxed constraints and generally easier alignment. Requiring the use of fewer corners is particularly beneficial in low isothermal conditions because of the difficulty of finding and matching corners.

As used herein, the term "line" is defined as a set of one or more pixels (i) that has uniform intensity with a first nearby patch of pixels that are located horizontally relative to the set of one or more pixels and that has non-uniform intensity with a second nearby patch of pixels that are located vertically relative to the set of one or more pixels, or, alternatively, (ii) that has non-uniform intensity with the first nearby patch of pixels that are located horizontally relative to the set of one or more pixels and that has uniform intensity with the second nearby patch of pixels that are located vertically relative to the set of one or more pixels.

FIG. 13 shows a first image 1305 and a second image 1310, which are representative of the images in FIG. 12. FIG. 13 also shows how the embodiments are able to detect a corner feature 1315 in the first image 1305. While the embodiments are detecting corner features in the first image 1305, the embodiments are simultaneously detecting line features in the first image 1305, as shown by the line feature 1320 and the line feature 1325. It is typically the case that more lines can be detected as compared to the number of corners that can be detected.

The corner and line operations are also performed on the second image 1310. To illustrate, the embodiments identify a corner feature 1330. In parallel with the corner detection operation, the embodiments also detect lines in the second image 1310, as shown by the line feature 1335 and the line feature 1340.

Notice, the corner feature 1330 corresponds to the corner feature 1315; the line feature 1335 corresponds to the line feature 1320; and the line feature 1340 corresponds to the line feature 1325. The embodiments are able to identify these correspondences and then generate or use a motion model that fits or aligns these feature points (i.e. the corner and line features) with one another.

In accordance with the disclosed principles, a first threshold 1345 is defined, where this first threshold 1345 refers to the number of corresponding corner features that must be identified within the two images in order to then align them. A second threshold 1350 is also defined, where this second threshold 1350 refers to the number of corresponding line feature that must be identified within the two images in order to align them. The satisfaction of both of the first threshold 1345 and the second threshold 1350 enable the embodiments to align the content from the first image 1305 and the second image 1310 to generate the overlaid image 1355. Notably, these thresholds generally refer to an overall number of corners and lines that have to be identified. Later, another set of thresholds will also be described, where these thresholds refer to the number of matches that must be identified. Typically, these two sets of thresholds are the same, though that might not always be the case (e.g., such as perhaps in a scenario where additional line-based criteria are used, such as orthogonality or non-parallelism).

Notably, the first threshold 1345 is smaller than the threshold 1230 of FIG. 12. Whereas the threshold 1230 was often a value around 5, the first threshold 1345 can be a value as low as 3. Generally, the following two equations govern the values for the first threshold 1345 and the second threshold 1350.

$$0.5 * \text{number of matched lines} + 1 * \text{number of matched corners} >= 5 \quad (\text{Eq. 1})$$

$$\text{Number of matched corners} >= 3 (\text{Avoids aperture problem}) \quad (\text{Eq. 2})$$

Equation 2 mentions a so-called "aperture problem." Upon learning of the ease and speed of performing a line feature detection, one might question why the embodiments do not rely only on the line detection operation and avoid performing a corner detection operation. The reason is because detecting lines within an image results in the aperture problem, which will now be discussed in detail.

Figure 14:
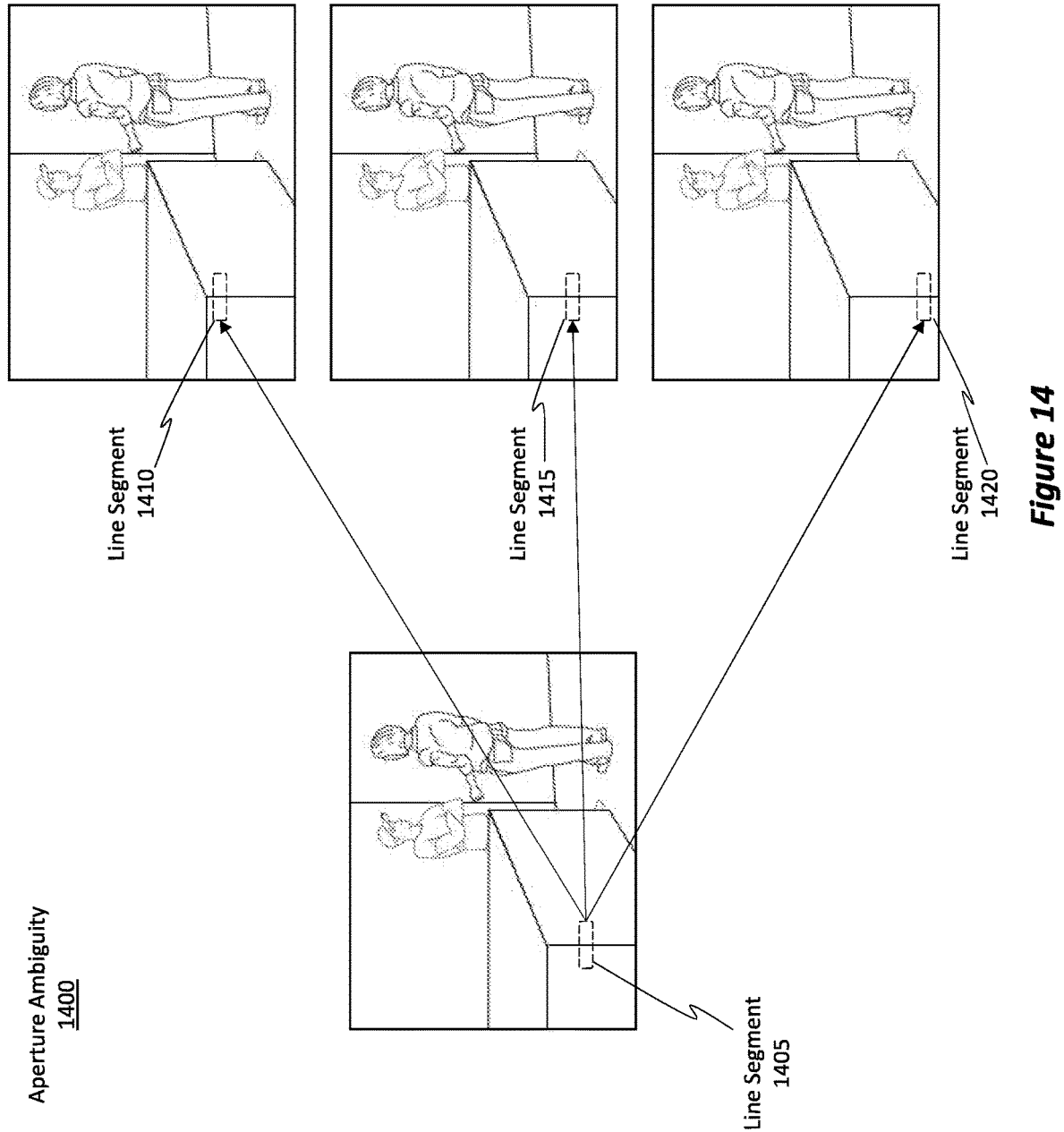
FIG. 14 illustrates an aperture problem.

FIG. 14 demonstrates the aperture problem, which can also be referred to herein as the aperture ambiguity 1400. To illustrate, recall how the embodiments are able to identify a line within an image, such as line segment 1405. In FIG. 14, the line segment 1405 is one part of an overall line. The aperture ambiguity 1400 refers to the scenario where multiple different segments of a line could (but incorrectly) correlate to the identified line segment 1405.

For instance, it might be the case that line segment 1410 could be a patch of pixels that match the line segment 1405, though the line segment 1410 is actually at the wrong location or position. Similarly, it could be the case the line segment 1415 or line segment 1420 could include patches of pixels that might map or match the pixels in the line segment 1405. Such a scenario introduces ambiguity into the alignment process. As a result, relying on line detection processes by themselves is not a sufficient technique. That being said, relying on a combination of lines and corners can enable the embodiments to use relaxed constraints, thereby improving computing efficiency.

Example Process Flow

Figure 15:
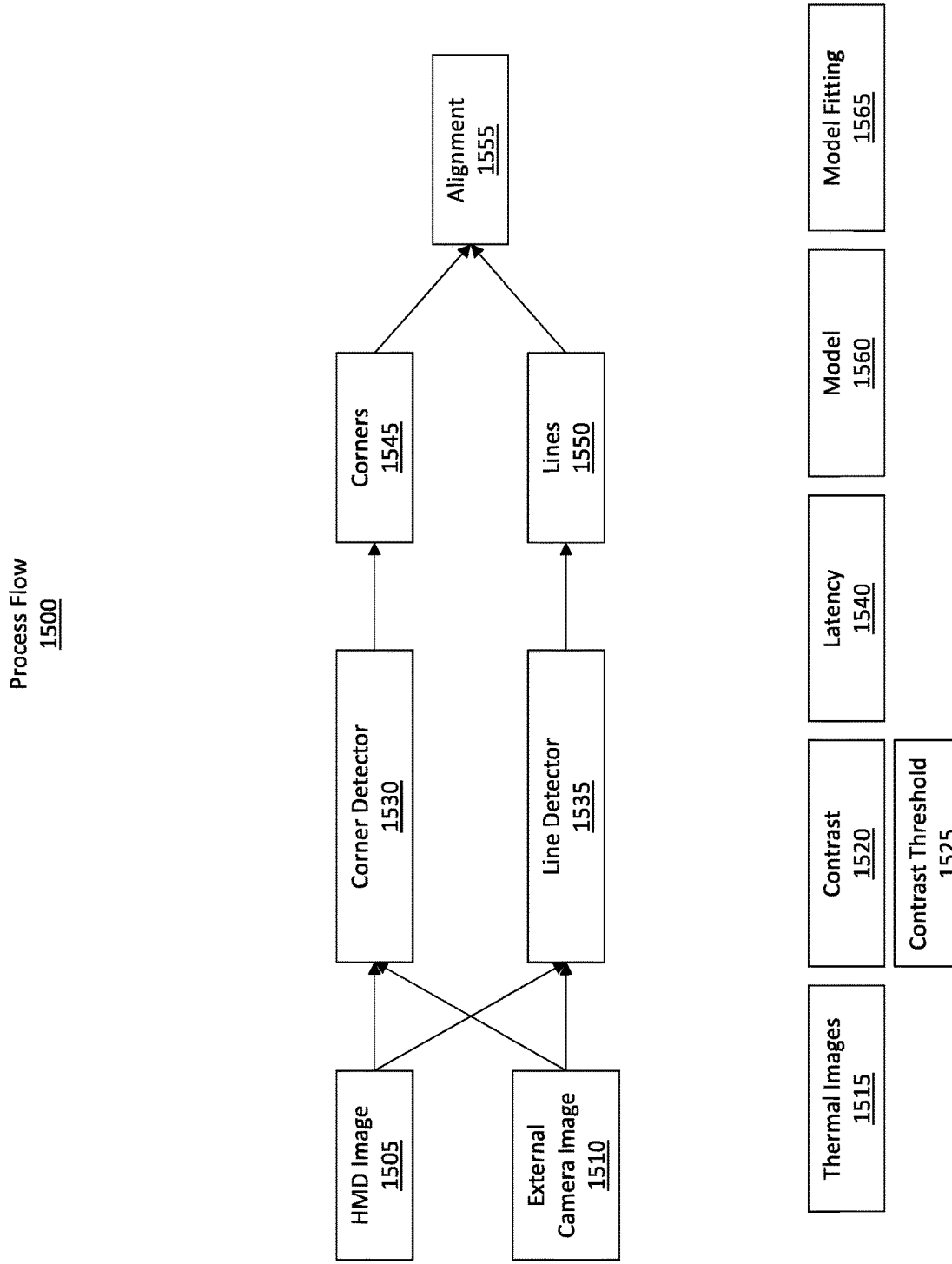
FIG. 15 illustrates a process flow for detecting both lines and corners to align images.

FIG. 15 shows an example process flow 1500 that illustrates the disclosed principles at a high level. Initially, a set of images are acquired, such as the HMD image 1505 and an external camera image 1510. It may be the case that these images are thermal images 1515. Furthermore, it may be the case that the temperature gradient or contrast 1520 in these images is below a particular contrast threshold 1525. As a result, it might be quite difficult to identify a sufficient number of corners within the images. In such a scenario, it is beneficial to utilize a hybrid approach where a combination of corners and lines are detected in order to achieve alignment.

The embodiments feed the HMD image 1505 and the external camera image 1510 into a corner detector 1530 as well as into a line detector 1535. These two detectors operate in parallel with one another, and there is no dependency on one another. Notably, the line detector 1535 is often faster in detecting lines than the corner detector 1530 is in detecting corners. That is, the amount of latency 1540 for the line detector 1535 is less than that of the corner detector 1530.

The corner detector 1530 analyzes the two images and identifies corners 1545 within those images. Similarly, the line detector 1535 analyzes the two images and identifies lines 1550 within those images. The embodiments then perform an alignment 1555 by identifying corresponding corners and lines within the two images.

A threshold number of lines and corners will need to be identified (and matched) in order to perform the alignment 1555. The matching threshold is more relevant than the number of identified corners or lines threshold. That is, the embodiments might identify 10 corners and 20 lines. Out of the 10 corners, it might be the case that only 5 corners are considered "matched" corners (i.e. a first corner in image A is identified as having a counterpart in image B, a second corner is identified as having a counterpart, and so on). The "matched" corner threshold, as described previously, is at least three corners. Similarly, the "matched" line threshold is at least four lines. To achieve these matches, at least three corners (i.e. corresponding pairs of corners) must be identified in the images. Similarly, at least four lines must be identified. Therefore, although the 3 and 4 values are the same for the different thresholds (e.g., matched thresholds vs total number of identified feature thresholds), the thresholds are in fact different, though the "matched" thresholds are the primary consideration.

The embodiments then fit the identified corners and lines into a 3D model 1560, such as a motion model. This model 1560 is then subjected to a model fitting 1565 operation in order to rotate, translate, and/or transform one image (using the corners and lines as reference points) to match or align with the corresponding corners and lines in the other image. In other words, the embodiments use the identified corners and lines when performing a reprojection operation in order to align the content from one image with the content from another image.

Figure 16:
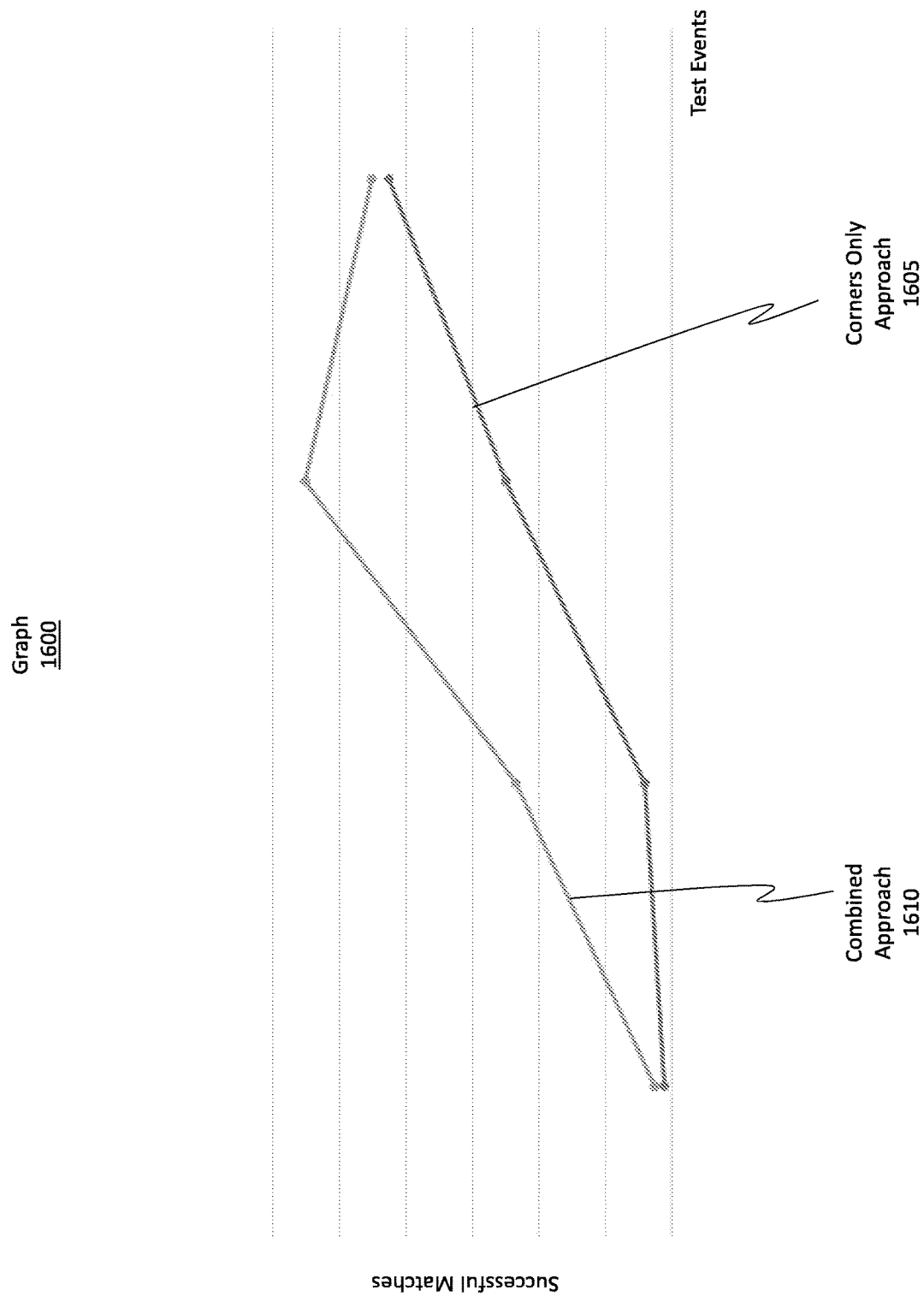
FIG. 16 illustrates some of the benefits of performing the disclosed principles.

FIG. 16 illustrates the benefits of performing the disclosed operations. In particular, FIG. 16 shows an example graph 1600 plotting the number of successful matches by performing a corners only approach 1605 versus performing the combined approach 1610 (i.e. the corner and line detection). Notice, the number of successful matches using the combined approach 1610 is consistently higher than the number of successful matches that is achieved using the corners only approach 1605. In this manner, not only does the combined approach produce better results, but it also allows for relaxed constraints as compared to the corners-only approach (e.g., 3 corners versus 5 corners).

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 17:
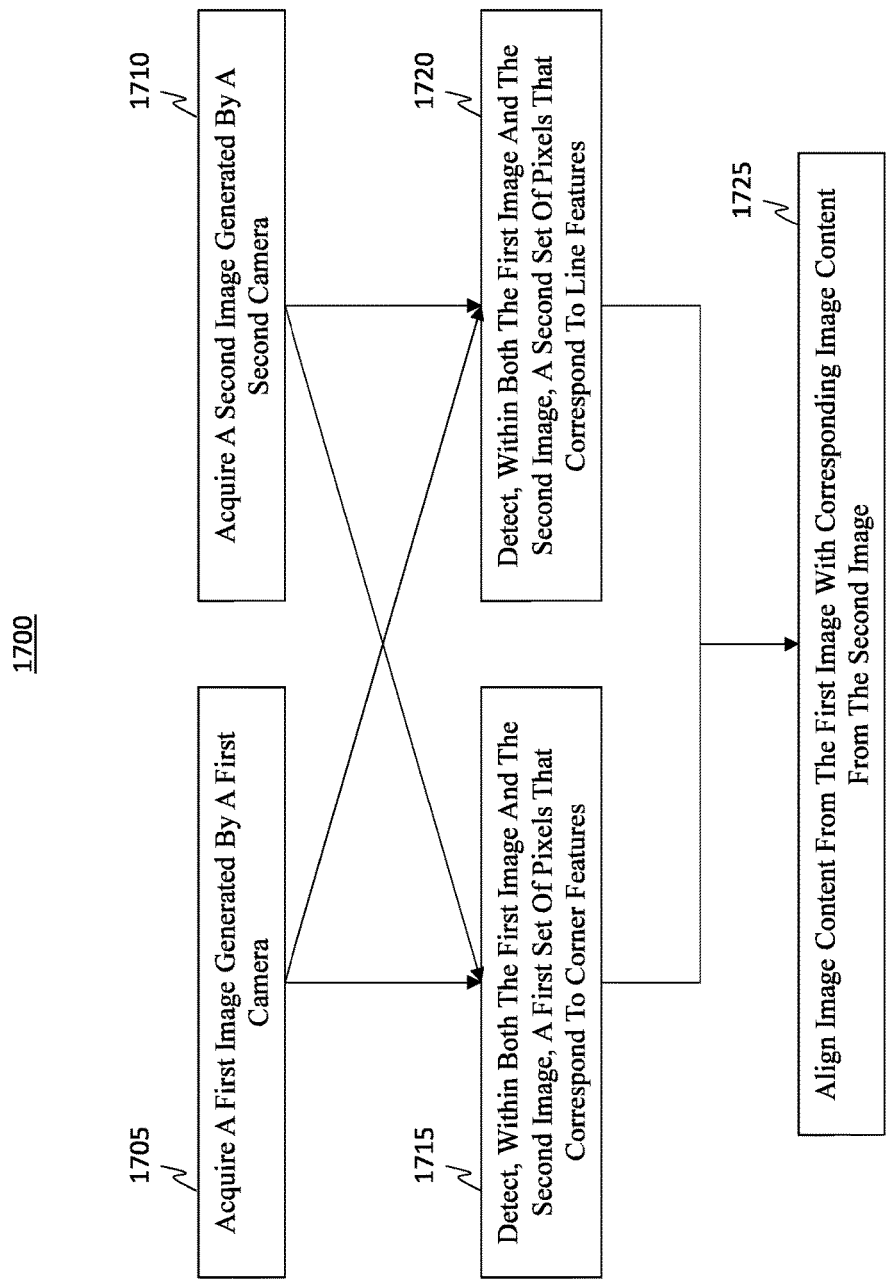
FIG. 17 illustrates a flowchart of an example method for detecting lines and corners to align content.

FIG. 17 shows a flowchart of an example method 1700 for aligning content from images that are generated by different cameras, where the alignment is performed by concurrently identifying corresponding corner features and line features within the images and by aligning the images based on a combination of the identified corner features and line features. Such processes result in relaxed constraints during the alignment as compared to constraints that are required when aligning the images using only the corner features.

Method 1700 includes an act (act 1705) of acquiring a first image generated by a first camera. Act 1710 includes acquiring a second image generated by a second camera that is detached from the first camera. Acts 1705 and 1710 can be performed at the same time.

In some cases, the first image and the second image are both thermal images. Further, performance of method 1700 can be triggered in response to a determination that a scene depicted by the first image and the second image has temperature conditions (e.g., contrast conditions, gradient conditions, etc.) that are below an isothermal threshold. In some cases, both the first image and the second image have contrasts that are below a contrast threshold such that both the first image and the second image are considered low contrast images. Because of this low contrast, it can be quite difficult to identify a sufficient number of corners (if the corners-only approach were used).

Act 1715 includes detecting, within both the first image and the second image, a first set of pixels that correspond to corner features. During an overlapping time period with when the first set of pixels are detected (e.g., at least partially in parallel with detecting the first set of pixels), act 1720 includes detecting, within both the first image and the second image, a second set of pixels that correspond to line features. As mentioned previously, detecting the second set of pixels that correspond to the line features is performed faster than detecting the first set of pixels that correspond to the corner features. Stated differently, detecting the first set of pixels that correspond to the corner features is performed with a higher level of latency (i.e. more time delay) than detecting the second set of pixels that correspond to the line features.

Notably, use of the pixels in the second set of pixels, which correspond to the line features, to align image content results in an aperture ambiguity. That being said, use of the pixels in the first set of pixels, which correspond to the corner features, results in a resolution of the aperture ambiguity. Stated differently, although the embodiments introduce aperture ambiguity as a result of relying on line features, this aperture ambiguity is resolved as a result of also relying on the corner features because use of the corner features forces an accurate alignment to occur, thereby resolving the aperture ambiguity.

Act 1725 then includes aligning image content from the first image with corresponding image content from the second image. Notably, the aligning process is performed using at least some of the pixels in the first set of pixels, which correspond to the corner features, and using at least some of the pixels in the second set of pixels, which correspond to the line features.

To determine that the image content from the first image is able to be sufficiently aligned with the corresponding image content from the second image, a first threshold number of corner features is required to be identified and a second threshold number of line features is required to be identified. At a barest minimum, the first threshold number of corner features is at least 3. The second threshold number of line features is at least 4. With these minimums, all 3 of the corners must be "matched" (i.e. all 3 corners in one image must have an identified counterpart in a second image) and all 4 of the lines must be matched. As a consequence, at least 3 corner features and at least 4 line features are required to be identified to determine that the image content from the first image is able to be sufficiently aligned with the corresponding image content from the second image. In some cases, the embodiments can require a higher number of corners and lines be identified. With a higher number of identifications, the chances of finding matched pairs necessarily improves.

In some cases, method 1700 can further include a model fitting operation that includes estimating a three-dimensional (3D) rotation in which (i) corner features identified in the first image align with corresponding corner features identified in the second image, and (ii) line features identified in the first image align with corresponding line features identified in the second image. The process of estimating the 3D rotation can also be performed using one of a translational model, a similarity transform, an affine model, or an homography model.

Figure 18:
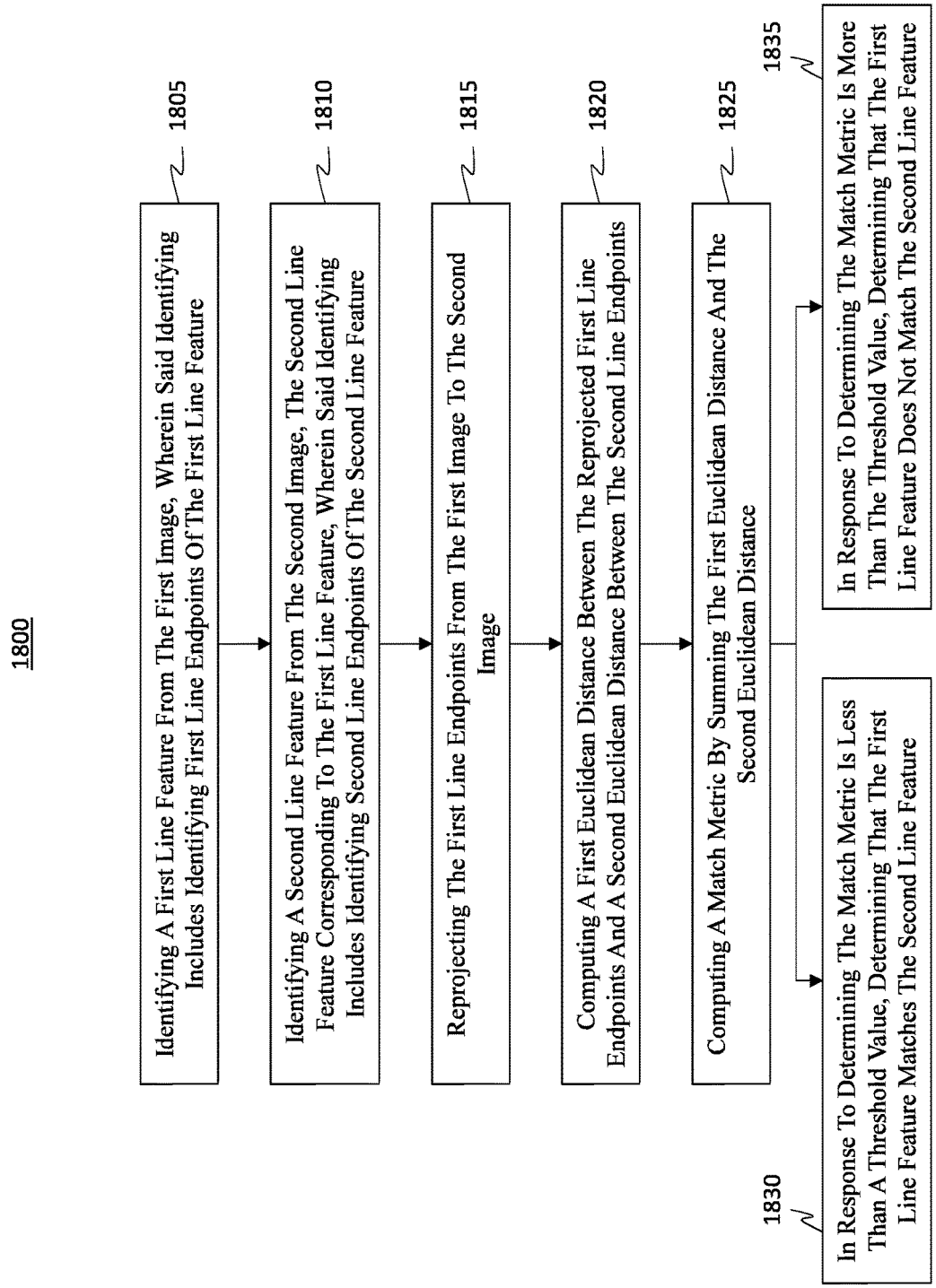
FIG. 18 illustrates additional clarification regarding the alignment process.

FIG. 18 provides additional details regarding the alignment process mentioned in act 1725 of FIG. 17. Specifically, FIG. 18 describes an alignment method 1800 that includes an act (act 1805) of identifying a first line feature from the first image. This identification process includes identifying first line endpoints of the first line feature.

Act 1810 includes identifying a second line feature from the second image. The second line feature corresponds to the first line feature (but is included in the second image). This identification process includes identifying second line endpoints of the second line feature.

Act 1815 includes reprojecting the first line endpoints from the first image (or the second image) to the second image (or to the first image). Act 1820 then includes computing a first Euclidean distance between the reprojected first line endpoints and a second Euclidean distance between the second line endpoints.

A match metric is then computed (act 1825) by summing the first Euclidean distance and the second Euclidean distance. In response to determining the match metric is less than a threshold value, act 1830 includes determining that the first line feature sufficiently matches the second line feature. In response to determining the match metric is more than the threshold value, act 1835 includes determining that the first line feature does not sufficiently match the second line feature.

After aligning the image content from the first image with the corresponding image content from the second image, the embodiments can generate an overlaid image. In this overlaid image, the corresponding image content from the second image is overlaid on top of the image content from the first image. Optionally, a head-mounted device (HMD) can be provided, and the overlaid image can be displayed using the HMD. In some cases, the first camera is included as a part of the HMD.

To align the image content from the first image with the corresponding image content from the second image, a first threshold number of corner features are required to be aligned/matched within one another from the first image and from the second image. Similarly, a second threshold number of line features are required to be aligned/matched with one another from the first image and from the second image. Equations 1 and 2 referred to these thresholds. For instance, the first threshold number of "matched: corner features is 3, and the second threshold number of "matched" line features is 4. As a result, at least 3 corner features are required to be aligned/matched between the first image and the second image and at least 4 line features are required to be aligned/matched between the first image and the second image.

Figure 19:
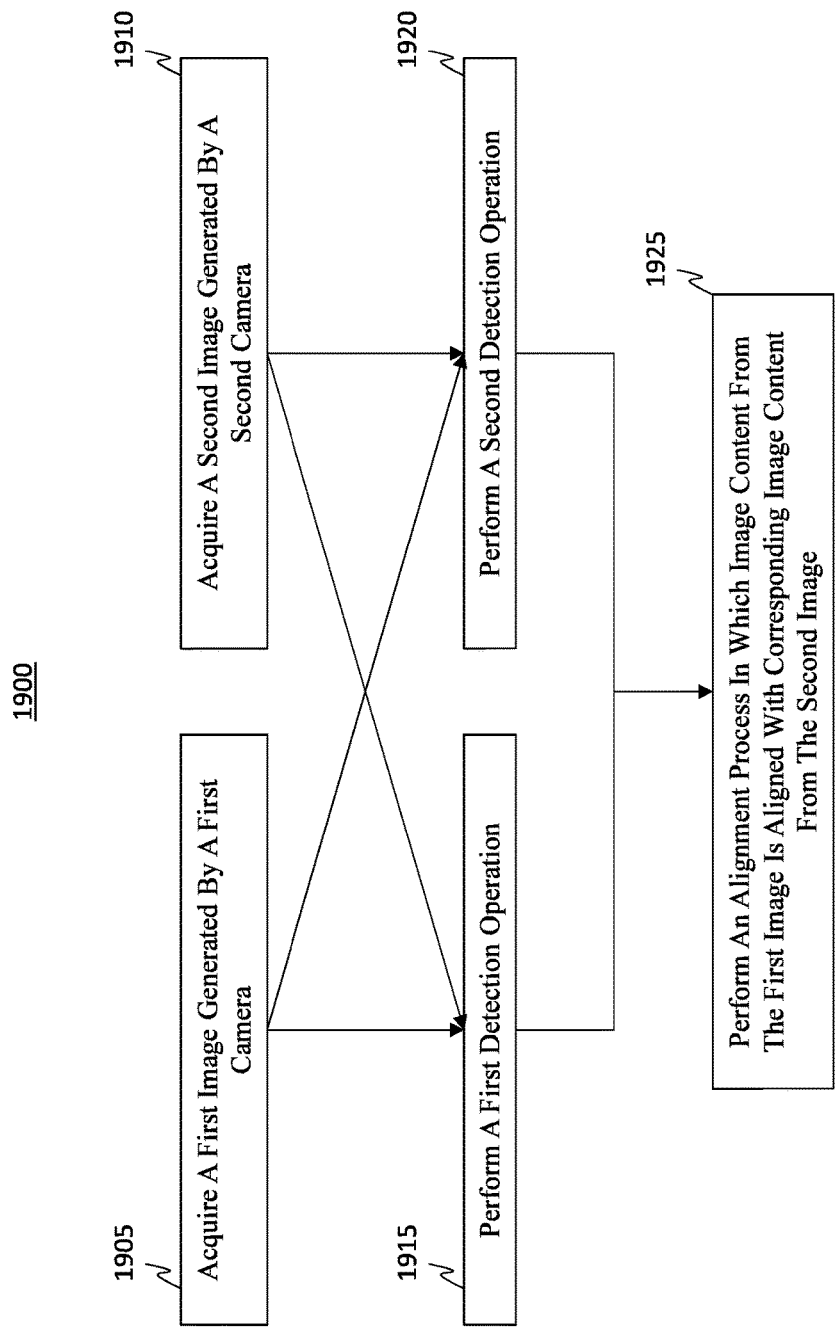
FIG. 19 illustrates another method for aligning content.

Attention will now be directed to FIG. 19, which shows a method 1900 for aligning content from images that are generated by different cameras, where the alignment is performed by concurrently identifying unambiguous features that are uniquely identifiable within the images (e.g., corner features) and identifying potentially ambiguous features that are susceptible to aperture ambiguity (e.g., line features). The alignment is based on a combination of the unambiguous features and the potentially ambiguous features, thereby resulting in relaxed constraints during the alignment as compared to constraints that are required when aligning the images using only the unambiguous features.

Act 1905 includes acquiring a first image generated by a first camera. Act 1910 includes acquiring a second image generated by a second camera that is detached from the first camera.

Act 1915 includes performing a first detection operation. This first detection operation includes detecting, within the first image, a first set of pixels that correspond to unambiguous features that are uniquely identifiable within the first image (e.g., corner features in the first image). The operation further includes detecting, within the second image, a second set of pixels that correspond to the unambiguous features that are included in the first image (e.g., corner features in the second image, where these corners correspond to the corners that were identified in the first image).

During an overlapping time period in which the first detection operation occurs, act 1920 includes performing a second detection operation. This second detection operation includes detecting, within the first image, a third set of pixels that correspond to potentially ambiguous features that are susceptible to aperture ambiguity (e.g., line features in the first image). The second detection operation further includes detecting, within the second image, a fourth set of pixels that correspond to the potentially ambiguous features that are included in the first image (e.g., line features in the second image, where these lines correspond to the lines that were identified in the first image).

Act 1925 includes performing an alignment process in which image content from the first image is aligned with corresponding image content from the second image. This alignment process includes reprojecting at least some pixels in the second set of pixels to positions corresponding to positions of at least some pixels in the first set of pixels. The alignment process further includes reprojecting at least some pixels in the fourth set of pixels to positions corresponding to positions of at least some pixels in the third set of pixels. These reprojection operations can be performed using the motion models that were discussed earlier.

As mentioned above, the unambiguous features that are uniquely identifiable are corner features. Similarly, the potentially ambiguous features that are susceptible to the aperture ambiguity are line features.

In some implementations, the weights and or thresholds that were illustrated in equation 1 can be modified. For instance, it may be the case that the 0.5 weight can be modified (e.g., such as perhaps to 0.75 or some other value), thereby potentially resulting in fewer lines that need to be matched. Modifying this weight can optionally occur when the detected lines are determined to be non-parallel or perhaps orthogonal to one another. It may be the case that the aperture ambiguity can be resolved if the embodiments can determine the direction a line has. If two lines are non-parallel, then the chances of those lines having the aperture problem are low to non-existent. Therefore, the thresholds and weights can, in some instances, be modified based on the characteristics of the detected lines.

Accordingly, the disclosed embodiments detect lines and corners within images. These lines and corners are then used as feature points to align the two images with one another. A resulting overlaid image can then be generated and displayed.

Example Computer/Computer Systems

Figure 20:
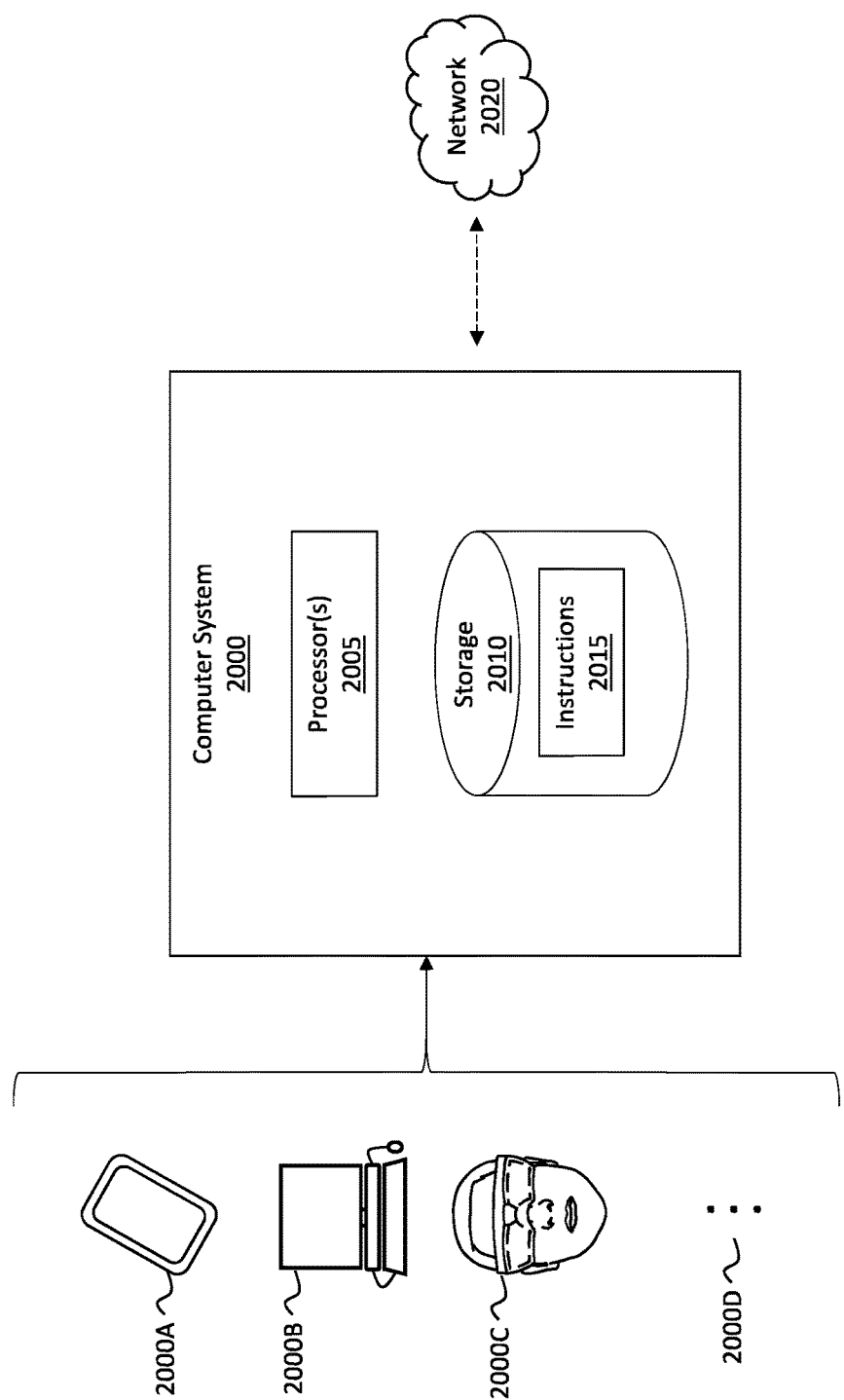
FIG. 20 illustrates an example computer system configured to perform any of the disclosed operations.

Attention will now be directed to FIG. 20 which illustrates an example computer system 2000 that may include and/or be used to perform any of the operations described herein. Computer system 2000 may take various different forms. For example, computer system 2000 may be embodied as a tablet 2000A, a desktop or a laptop 2000B, a wearable device 2000C (e.g., a HMD), a mobile device, or any other standalone device, as represented by the ellipsis 2000D. Computer system 2000 may also be a distributed system that includes one or more connected computing components/devices that are in communication with computer system 2000.

In its most basic configuration, computer system 2000 includes various different components. FIG. 20 shows that computer system 2000 includes one or more processor(s) 2005 (aka a "hardware processing unit") and storage 2010.

Regarding the processor(s) 2005, it will be appreciated that the functionality described herein can be performed, at least in part, by one or more hardware logic components (e.g., the processor(s) 2005). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 2000. The different components, modules, engines, and services described herein may be implemented as objects or processors that execute on computer system 2000 (e.g. as separate threads).

Storage 2010 may be physical system memory, which may be volatile, non-volatile, or some combination of the two. The term "memory" may also be used herein to refer to non-volatile mass storage such as physical storage media. If computer system 2000 is distributed, the processing, memory, and/or storage capability may be distributed as well.

Storage 2010 is shown as including executable instructions 2015. The executable instructions 2015 represent instructions that are executable by the processor(s) 2005 of computer system 2000 to perform the disclosed operations, such as those described in the various methods.

The disclosed embodiments may comprise or utilize a special-purpose or general-purpose computer including computer hardware, such as, for example, one or more processors (such as processor(s) 2005) and system memory (such as storage 2010), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RANI, ROM, EEPROM, CD-ROM, solid state drives ("SSD") that are based on RANI, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 2000 may also be connected (via a wired or wireless connection) to external sensors (e.g., one or more remote cameras) or devices via a network 2020. For example, computer system 2000 can communicate with any number devices or cloud services to obtain or process data. In some cases, network 2020 may itself be a cloud network. Furthermore, computer system 2000 may also be connected through one or more wired or wireless networks to remote/ separate computer systems(s) that are configured to perform any of the processing described with regard to computer system 2000.

A "network," like network 2020, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 2000 will include one or more communication channels that are used to communicate with the network 2020. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RANI and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for aligning content from images that are generated by different cameras, where the alignment is performed by concurrently identifying corresponding corner features and line features within the images and by aligning the images based on a combination of the identified corner features and line features, thereby resulting in relaxed constraints during said alignment as compared to constraints that are required when aligning the images using only the corner features, said method comprising:
   acquiring a first image generated by a first camera;
   acquiring a second image generated by a second camera that is detached from the first camera;
   detecting, within both the first image and the second image, a first set of pixels that correspond to corner features;
   detecting, within both the first image and the second image, a second set of pixels that correspond to line features; and
   aligning image content from the first image with corresponding image content from the second image, wherein said aligning is performed using at least some of the pixels in the first set of pixels, which correspond to the corner features, and using at least some of the pixels in the second set of pixels, which correspond to the line features.

2. The method of claim 1, wherein detecting the second set of pixels is performed during an overlapping time period with when the first set of pixels are detected.

3. The method of claim 1, wherein any particular corner feature included among the corner features is defined as a pixel that has non-uniform intensity with a first nearby patch of pixels that are located horizontally relative to the pixel and with a second nearby patch of pixels that are located vertically relative to the pixel.

4. The method of claim 1, wherein any particular line feature included among the line features is defined as a pixel that has:
   uniform intensity with a first nearby patch of pixels that are located horizontally relative to the pixel and that has non-uniform intensity with a second nearby patch of pixels that are located vertically relative to the pixel, or, alternatively,
   non-uniform intensity with the first nearby patch of pixels that are located horizontally relative to the pixel and that has uniform intensity with the second nearby patch of pixels that are located vertically relative to the pixel.

5. The method of claim 1, wherein detecting the second set of pixels that correspond to the line features is performed faster than detecting the first set of pixels that correspond to the corner features.

6. The method of claim 1, wherein, to determine that the image content from the first image is able to be sufficiently aligned with the corresponding image content from the second image, a first threshold number of corner features is required to be identified and a second threshold number of line features is required to be identified.

7. The method of claim 6, wherein the first threshold number of corner features is 3, and wherein the second threshold number of line features is 4 such that at least 3 corner features and at least 4 line features are required to be identified to determine that the image content from the first image is able to be sufficiently aligned with the corresponding image content from the second image.

8. The method of claim 1, wherein the method further includes a model fitting operation that includes estimating a three-dimensional (3D) rotation in which:
   corner features identified in the first image align with corresponding corner features identified in the second image, and
   line features identified in the first image align with corresponding line features identified in the second image.

9. The method of claim 8, wherein one of a translational model, a similarity transform, an affine model, or an homography model is used to estimate the 3D rotation.

10. A computer system configured to align content from images that are generated by different cameras, where the alignment is performed by concurrently identifying corresponding corner features and line features within the images and by aligning the images based on a combination of the identified corner features and line features, thereby resulting in relaxed constraints during said alignment as compared to constraints that are required when aligning the images using only the corner features, said computer system comprising:
   one or more processors; and
   one or more computer-readable hardware storage devices that store instructions that are executable by the one or more processors to cause the computer system to:
   acquire a first image generated by a first camera;
   acquire a second image generated by a second camera that is different than the first camera;
   detect, within both the first image and the second image, a first set of pixels that correspond to corner features;
   at least partially in parallel with detecting the first set of pixels, detect, within both the first image and the second image, a second set of pixels that correspond to line features; and
   align image content from the first image with corresponding image content from the second image, wherein said aligning is performed using at least some of the pixels in the first set of pixels, which correspond to the corner features, and using at least some of the pixels in the second set of pixels, which correspond to the line features.

11. The computer system of claim 10, wherein aligning the image content from the first image with the corresponding image content from the second image includes:
   identifying a first line feature from the first image, wherein said identifying includes identifying first line endpoints of the first line feature;
   identifying a second line feature from the second image, the second line feature corresponding to the first line feature, wherein said identifying includes identifying second line endpoints of the second line feature;
   reprojecting the first line endpoints from the first image to the second image;
   computing a first Euclidean distance between the reprojected first line endpoints and a second Euclidean distance between the second line endpoints;
   computing a match metric by summing the first Euclidean distance and the second Euclidean distance;
   in response to determining the match metric is less than a threshold value, determining that the first line feature matches the second line feature; and
   in response to determining the match metric is more than the threshold value, determining that the first line feature does not match the second line feature.

12. The computer system of claim 10, wherein use of the at least some of the pixels in the second set of pixels, which correspond to the line features, to perform said aligning results in an aperture ambiguity, and wherein use of the at least some of the pixels in the first set of pixels, which correspond to the corner features, results in a resolution of the aperture ambiguity.

13. The computer system of claim 10, wherein both the first image and the second image have contrasts that are below a contrast threshold such that both the first image and the second image are low contrast images.

14. The computer system of claim 10, wherein detecting the first set of pixels that correspond to the corner features is performing with a higher level of latency than detecting the second set of pixels that correspond to the line features.

15. The computer system of claim 10, wherein the instructions are further configured to cause the computer system to:
   after aligning the image content from the first image with the corresponding image content from the second image, generate an overlaid image in which the corresponding image from the second image is overlaid on top of the image content from the first image.

16. The computer system of claim 10, wherein the computer system is a head-mounted device (HMD), and wherein the first camera is included as a part of the HMD.

17. The computer system of claim 10, wherein, to align the image content from the first image with the corresponding image content from the second image, a first threshold number of corner features are required to be aligned within one another from the first image and from the second image and a second threshold number of line features are required to be aligned with one another from the first image and from the second image.

18. The computer system of claim 17, wherein the first threshold number of corner features is 3, and wherein the second threshold number of line features is 4 such that at least 3 corner features are required to be aligned between the first image and the second image and such that at least 4 line features are required to be aligned between the first image and the second image.

19. A method for aligning content from images that are generated by different cameras, wherein the alignment is performed by concurrently identifying unambiguous features that are uniquely identifiable within the images and identifying potentially ambiguous features that are susceptible to aperture ambiguity, and wherein the alignment is based on a combination of the unambiguous features and the potentially ambiguous features, thereby resulting in relaxed constraints during said alignment as compared to constraints that are required when aligning the images using only the unambiguous features, said method comprising:
   acquiring a first image generated by a first camera;
   acquiring a second image generated by a second camera that is detached from the first camera;
   performing a first detection operation that includes:
      detecting, within the first image, a first set of pixels that correspond to unambiguous features that are uniquely identifiable within the first image;
      detecting, within the second image, a second set of pixels that correspond to the unambiguous features that are included in the first image;
   performing a second detection operation that includes:
      detecting, within the first image, a third set of pixels that correspond to potentially ambiguous features that are susceptible to aperture ambiguity;
      detecting, within the second image, a fourth set of pixels that correspond to the potentially ambiguous features that are included in the first image;
   performing an alignment process in which image content from the first image is aligned with corresponding image content from the second image, wherein said alignment process includes:
      reprojecting at least some pixels in the second set of pixels to positions corresponding to positions of at least some pixels in the first set of pixels; and
      reprojecting at least some pixels in the fourth set of pixels to positions corresponding to positions of at least some pixels in the third set of pixels.

20. The method of claim 19, wherein the unambiguous features that are uniquely identifiable are corner features, and wherein the potentially ambiguous features that are susceptible to the aperture ambiguity are line features.

* * * * *